United States Patent
Hoshiya et al.

(10) Patent No.: US 8,174,799 B2
(45) Date of Patent: May 8, 2012

(54) DIFFERENTIAL MAGNETORESISTIVE MAGNETIC HEAD

(75) Inventors: Hiroyuki Hoshiya, Kanagawa (JP); Kenichi Meguro, Kanagawa (JP); Katsumi Hoshino, Kanagawa (JP); You Sato, Kanagawa (JP); Hiroyuki Katada, Kanagawa (JP); Kazuhiro Nakamoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 899 days.

(21) Appl. No.: 12/218,860

(22) Filed: Jul. 17, 2008

(65) Prior Publication Data

US 2009/0034135 A1   Feb. 5, 2009

(30) Foreign Application Priority Data

Jul. 20, 2007   (JP) .................................. 2007-189631

(51) Int. Cl.
*G11B 5/39* (2006.01)
(52) U.S. Cl. .................................. 360/314; 360/324.12
(58) Field of Classification Search ............. 360/324.12, 360/314
See application file for complete search history.

(56) References Cited

U.S. PATENT DOCUMENTS

| | | | |
|---|---|---|---|
| 5,408,377 A | 4/1995 | Gurney et al. | |
| 5,576,915 A | 11/1996 | Akiyama et al. | |
| 5,751,521 A * | 5/1998 | Gill | 360/314 |
| 6,927,948 B2 | 8/2005 | Gill | |
| 7,697,242 B2 * | 4/2010 | Gill | 360/314 |
| 2003/0123198 A1 | 7/2003 | Sugawara et al. | |
| 2004/0169965 A1* | 9/2004 | Attenborough et al. | 360/324.12 |
| 2005/0068683 A1* | 3/2005 | Gill | 360/314 |
| 2005/0105219 A1* | 5/2005 | Mao et al. | 360/315 |

FOREIGN PATENT DOCUMENTS

| | | |
|---|---|---|
| JP | 2002/151758 | 5/2002 |
| JP | 2002-151758 A | 5/2002 |
| JP | 2003/069109 | 3/2003 |
| JP | 2004/227749 | 8/2004 |
| JP | 2007/085426 | 4/2007 |

* cited by examiner

*Primary Examiner* — Julie Anne Watko
(74) *Attorney, Agent, or Firm* — Zilka-Kotab, PC

(57) ABSTRACT

Embodiments of the present invention help to provide a single element type differential magnetoresistive magnetic head capable of achieving high resolution and high manufacturing stability. According to one embodiment, a magnetoresistive layered film is formed by stacking an underlayer film, an antiferromagnetic film, a ferromagnetic pinned layer, a non-magnetic intermediate layer, a soft magnetic free layer, a long distance antiparallel coupling layered film, and a differential soft magnetic free layer. The long distance antiparallel coupling layered film exchange-couples the soft magnetic free layer and the differential soft magnetic free layer in an antiparallel state with a distance of about 3 nanometers through 20 nanometers. By manufacturing the single element type differential magnetoresistive magnetic head using the magnetoresistive layered film, it becomes possible to achieve the high resolution and the high manufacturing stability without spoiling the GMR effect.

19 Claims, 17 Drawing Sheets

DIFFERENTIAL MAGNETORESISTIVE MAGNETIC HEAD

CROSS-REFERENCE TO RELATED APPLICATION

The instant nonprovisional patent application claims priority to Japanese Patent Application No. 2007-189631 filed Jul. 20, 2007 and which is incorporated by reference in its entirety herein for all purposes.

BACKGROUND OF THE INVENTION

A magnetoresistive magnetic head is used as a read sensor in a high recording density magnetic recording technology including a hard disk drive as a main constituent thereof, and influences the performance of the magnetic recording technology. In an environment in which the recording densities of magnetic recording and reproducing devices have rapidly increased, it has not been achieved to realize a magnetic recording and reproducing device having a sufficiently high recording density, in particular to realize a magnetoresistive magnetic head acting with sufficient sensitivity and outputs to the external magnetic field in the read section of the magnetic recording and reproducing device, and further to obtain a preferable characteristic with sufficiently good stability in the prior art, and it has been difficult to realize the function as a storage device.

In recent years, it has been known that the magnetoresistance effect of a multilayer film formed by stacking ferromagnetic metal layers via a nonmagnetic metal layer, so-called giant magnetoresistance effect, is strong. In the past, in the case in which the magnetoresistive film is used as a magnetic sensor, a so-called CIP-GMR film, which flows an electric current in-plane of the layered film, has been used. Further, a so-called CPP-GMR film, which is a perpendicular current type giant magnetoresistive film flowing an electric current in the film thickness direction of the layered film, has also been under investigation. A TMR film, which uses tunneling magnetoresistance effect flowing an electric current in the film thickness direction of the layered film in a similar manner, has also been under research and development.

A disadvantage of the magnetic head using the conventional magnetoresistive magnetic sensor, is that high resolution in the linear density direction is not achievable. In the conventional magnetic head, the resolution in the linear density direction is determined by a read gap defined by the distance between a pair of magnetic shields. Although it is conceivable that the high resolution with respect to the linear density direction can be achieved by narrowing the distance between the magnetic shields, since the magnetoresistive magnetic sensor needs to be disposed in the gap of the magnetic shields, it is obvious that the gap of the magnetic shields is geometrically limited by the thickness of the magnetoresistive magnetic sensor.

In more detail, it is desirable that the part of the magnetoresistive sensor for detecting the magnetic field, the part thereof called a soft magnetic free layer here, is disposed in the vicinity of the center of the magnetic shield gap. This is because, if the soft magnetic free layer described above is disposed so as to have contact with one of the magnetic shields or to be extremely close thereto, a larger amount of leakage magnetic flux from the recording medium to be detected flows into the thicker magnetic shield with high magnetic permeability than the amount of the leakage magnetic flux flowing into the soft magnetic free layer of the magnetoresistive magnetic sensor for detecting the leakage magnetic flux, which lowers the output of the magnetoresistive magnetic sensor.

Here, the thickness of the magnetoresistive magnetic sensor will be described. Although there are cited the CIP-GMR film, the TMR film described above, and further a CPP-GMR film, which is a magnetic sensor under research and development, as the magnetoresistive magnetic sensor presently used for the magnetic head for the hard disk drive, the configuration widely used as a fundamental configuration is a synthetic ferri-magnet-type spin valve structure. Specifically, it has a fundamental configuration composed of a base film, an antiferromagnetic film, a first ferromagnetic pinned layer, an antiparallel coupling layer, a second ferromagnetic pinned layer, a non-magnetic intermediate layer, a soft magnetic free layer, and a protective layer. The thickest of all of these constituents is the antiferromagnetic film, and the thickness thereof is conceivably about 8 nm. In estimating the total thickness by citing typical thicknesses, it makes 4+8+2+1+2+2+4+2=25 nm from the base film side, and consequently, the total film thickness of the configuration described above becomes approximately 25 nm. Since the soft magnetic free layer among these constituents is disposed on the end of one side in the sum total, in order for disposing the soft magnetic free layer so as not to be too close to the magnetic shield described above, it is necessary to add an electrically conductive film of about 5 nm, for example, to the protective film.

Therefore, in the magnetic head using the magnetoresistive magnetic sensor of the conventional type, the magnetic shield gap has a limitation of about 25+5=30 nm because of the thickness of the magnetoresistive magnetic sensor, and even though the gap can be reduced to some extent by an effort of reducing the thicknesses of the various films, it is quite difficult to manufacture the magnetic shield gap to be narrower than 30 nm, in particular equal to or narrower than 20 nm.

Meanwhile, as a technology, which has been proposed before, there is cited a differential magnetic head. Although the differential magnetic heads in the broad sense include a magnetic head for detecting the magnetic flux flowing in the magnetic gap using a magnetic yoke having the magnetic gap, since it is difficult to realize the magnetic yoke type differential magnetic head in the microscopic magnetic head having a track width of equal to or smaller than 0.1 μm in recent years, the magnetic yoke type differential magnetic head is to be excluded from the extent of the discussions. What is described here as the conventional technology is a magnetoresistive magnetic sensor for reading a signal at a position distant in the linear density direction, the magnetic head for performing a differential operation with respect to the signal at the position distant in a manner described above. In Japanese Patent Publication No. 7-85426 ("Patent Document 1"), there is a description of a dual-element type magnetoresistive head using an anisotropic magnetoresistive sensor. As what is similar to the magnetic head technology in recent years, as described in Japanese Patent Publication No. 2003-69109 ("Patent Document 2") and Japanese Patent Publication No. 2004-227749 ("Patent Document 3"), it can be manufactured so that the two magnetoresistive sensors disposed at positions distant in the linear density direction are formed, and the signals thereof cancel each other with respect to in-phase magnetic fields, and reinforce each other with respect to hetero-phase, namely differential magnetic fields. What these technologies seek for is to determine the resolution in the linear density direction, which has ever been determined by the magnetic shield gap, by the distance between the two sensors by performing differential operation of the signals of the two sensors disposed at the positions distant in the linear density direction, and in other words, the object thereof is to realize the higher resolution than in the conventional magnetic head.

The problem of the dual-element type differential magnetic head described above is difficulty in mass production as a commercial product. This is because, due to the nature of performing the differential-operation of the two sensors to obtain one signal, the defective and variation fraction, which is double as high as that of the conventional magnetic head formed of a single sensor, should be caused. For example, as the variation of the magnetic beads caused in the manufacturing process, the output variation and the variation in waveform symmetry are cited. It is assumed that the conventional magnetic head can be manufactured with the output variation suppressed to, for example, ±10%. If the dual-element type differential magnetic head is manufactured with the same technology, the output variation becomes ±20%, which is a simple addition of the variations of the two elements. Further, it is assumed that the screening of the magnetic head is performed to screen only the heads with preferable waveform symmetry in order for suppressing the variation in waveform symmetry to ±20%. If it can be performed with the defective fraction of 5% in the conventional magnetic head, the defective fraction of the dual-element type, which requires to screen those with both of the two elements having preferable waveform symmetry, is doubled to be approximately 10%. As described above, although the high resolution must be obtained in the dual-element type differential magnetic head, since the problem in the manufacturing process is serious, it has never been realized to the market where the high recording density and high reliability have been required in recent years.

BRIEF SUMMARY OF THE INVENTION

Embodiments of the present invention provide a single element type differential magnetoresistive magnetic head capable of achieving high resolution and high manufacturing stability. According to the embodiment of FIG. 1, a magnetoresistive layered film 10 is formed by stacking an underlayer film 14, an antiferromagnetic film 11, a ferromagnetic pinned layer 15, a non-magnetic intermediate layer 12, a soft magnetic free layer 13, a long distance antiparallel coupling layered film 17, and a differential soft magnetic free layer 16. The long distance antiparallel coupling layered film 17 exchange-couples the soft magnetic free layer 13 and the differential soft magnetic free layer 16 in an antiparallel state with a distance of 3 nanometers through 20 nanometers. By manufacturing the single element type differential magnetoresistive magnetic head using the magnetoresistive layered film 10, it becomes possible to achieve the high resolution and the high manufacturing stability without spoiling the GMR effect.

DETAILED DESCRIPTION OF THE INVENTION

Figure 1:
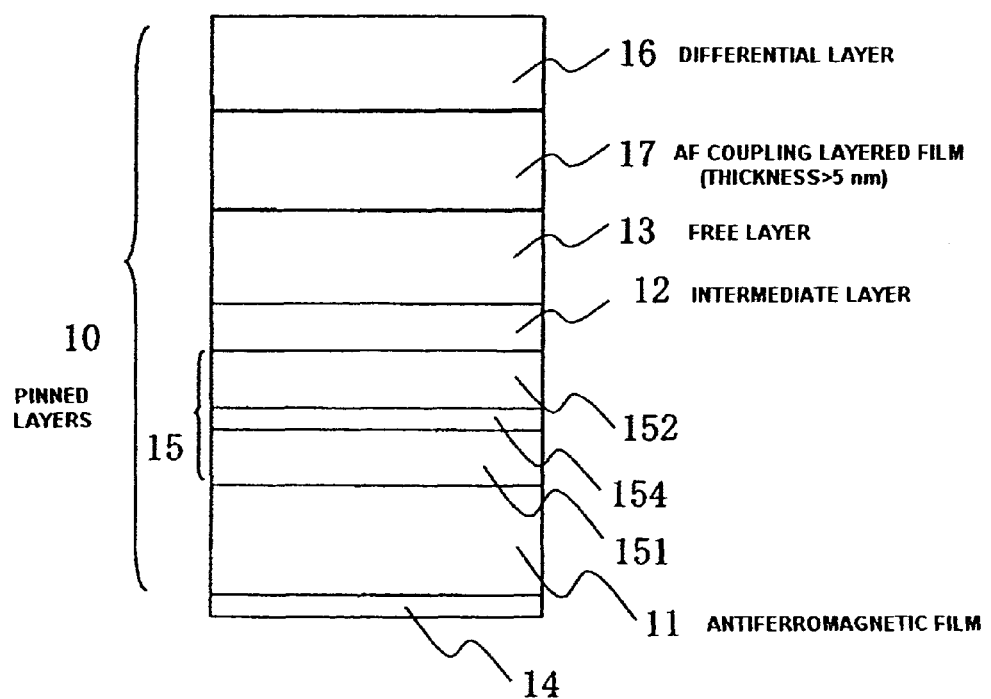
FIG. 1 is a diagram showing the layered structure of the typical magnetoresistive layered film of an embodiment of the present invention.

Embodiments of the present invention relate to a magnetic head to be mounted on a magnetic recording and reproducing device, and in particular to a differential magnetoresistive magnetic head for a high recording density magnetic recording and reproducing device.

Embodiments of the present invention have an object of providing a single element type differential magnetoresistive magnetic head capable of achieving high resolution and high manufacturing stability.

In embodiments of the present invention, there is used a magnetoresistive layered sensor film including a soft magnetic free layer, a differential soft magnetic free layer, and a long distance antiparallel coupling layered film (hereinafter simply referred also to as an antiparallel coupling layered film) for exchange-coupling the both layers in the antiparallel state with a distance of 3 through 20 nanometers. By manufacturing the single element type differential magnetoresistive magnetic head using this sensor film, it becomes possible to achieve the high resolution and the high manufacturing stability without spoiling the GMR effect or the TMR effect.

The long distance antiparallel coupling layered film is configured by alternately repeating stacking of n, an even number, antiparallel magnetic layers (hereinafter simply referred to as magnetic layers) and n+1 antiparallel coupling layers. The next antiparallel magnetic layer adjacent to the antiparallel magnetic layer via the antiparallel coupling layer is antiferromagnetically coupled with the adjacent antiparallel magnetic layer via the antiparallel coupling layer. According to this configuration, the coverage distance of the antiferromagnetic exchange coupling effect, which conventionally has an upper limit of 2 nanometers, can be expanded to be no shorter than 3 nanometers, as long as about 20 nanometers. By using even numbers as n, it becomes possible to make the soft magnetic free layer and the differential soft magnetic free layer have the coupling state in which the mutual magnetizations are arranged in an antiparallel manner via the long distance antiparallel coupling layered film.

The antiparallel coupling layer is made of one selected from the group comprising Ru, Ir, Os, Re, and Rh, or an alloy consisting primarily of these materials, and has a thickness of 0.3 through 0.5 nanometer or a thickness of 0.7 through 1 nanometer. By adopting such a configuration, the antiferromagnetic exchange coupling can be generated via the antiparallel coupling layer, thus the long distance antiparallel coupling can be realized.

The antiparallel magnetic layer is made of magnetic metal consisting primarily of CoFe or NiFe, and has the amount of magnetization (total of the products of saturated magnetization and the thickness) equivalent to or smaller than that of each of the soft magnetic free layer and the differential soft magnetic free layer, typically 4 nanometer-Tesla or less is preferable. This is because it is conceivable that the amount of magnetization of the soft magnetic free layer is typically in this level. Since it is conceivable that the saturation flux density of the magnetic film typically used here is 1 Tesla or higher, the typical condition of the thickness is thought to be 4 nanometers. Further, the thickness is assumed to be 0.5 nanometer or greater. By configuring as described above, it is possible to realize the antiferromagnetic coupling state between a pair of the antiparallel magnetic layer and the soft magnetic free layer adjacent to each other and a pair of the antiparallel magnetic layer and the differential soft magnetic layer, and the influence of the amount of magnetization of the antiparallel magnetic layer can be set smaller compared to that of the soft magnetic free layer and the differential soft magnetic free layer, and to form it so that the soft magnetic free layer and the differential soft magnetic free layer perform more dominant operation with respect to the magnetic field to be detected.

By using the magnetoresistive layered film having the long distance antiparallel coupling layered film configured as described above as a sensor, and forming the differential magnetoresistive magnetic head composed of one element, the differential magnetoresistive magnetic head and the magnetic recording and reproducing device capable of differentially detecting the magnetic field to be detected with high resolution in the linear recording density direction, and at the same time, having small variations and high yield in the manufacturing process can be realized.

According to embodiments of the present invention, the differential magnetic head using one sensor element formed of the magnetoresistive layered film having the soft magnetic free layer and the differential soft magnetic free layer antiferromagnetically coupled with each other via the long distance antiparallel coupling layered film can be realized, thus the high resolution in the linear density direction and the high manufacturing stability can be realized.

The thin film forming the magnetoresistive layered film according to an embodiment was manufactured as follows by a DC magnetron sputtering device. It was manufactured by sequentially stacking the following materials on a ceramics substrate in an atmosphere of argon atmosphere of from 0.2 to 3 milli-Torr. As sputtering targets, each of the targets of tantalum, nickel-iron alloy, copper, CoFe, MnIr, and ruthenium was used. Regarding the layered film, each of the layers was sequentially formed by applying DC power to each of the cathodes provided with the respective targets mounted thereon to generate plasmas inside the sputtering apparatus, and then opening and closing the shutters aligned to the respective cathodes.

When forming the film, the magnetic field of about 80 Oersted was applied in parallel to the substrate using a permanent magnet to provide uniaxial anisotropy. The thermal process of 270° C., 3 hours was executed on the film in vacuum and in the magnetic field to provide the exchange coupling magnetic field of the MnIr antiferromagnetic film. The element on the substrate was formed by patterning in the photoresist process. Subsequently, a slider process was executed on the substrate, and mounted on the magnetic recording and reproducing device.

A vibrating sample magnetometer was used for measuring the magnetized state of the layered film thus manufactured, and further, a model analysis by magnetization energy calculation in the Stoner-Wohlfarth magnetization model was used for the magnetized state analysis.

FIG. 1 shows the layered structure of the typical magnetoresistive layered film according to an embodiment of the present invention. The magnetoresistive layered film 10 is formed by stacking an underlayer film 14, an antiferromagnetic film 11, a ferromagnetic pinned layer 15, a non-magnetic intermediate layer 12, a soft magnetic free layer 13, a long distance antiparallel coupling layered film 17, and a differential soft magnetic free layer 16. Although the underlayer film 14 is not an essential constituent of the magnetoresistive layered film 10, it may be used since it can be made of a material effective for making the crystallinity and the magnetic characteristics of the magnetoresistive layered film preferable. Although not the essential constituent of the magnetoresistive layered film 10 similarly there to, it may be desirable to dispose a protective film (not shown) on an upper part of the magnetoresistive layered film 10 because unexpected oxidization or corrosion can be prevented.

The non-magnetic intermediate layer 12 magnetically separates the ferromagnetic pinned layer 15 and the soft magnetic free layer 13 from each other, and at the same time, has a configuration of generating the magnetoresistance effect for scattering, transmitting, or reflecting the electrons passing through the area between the ferromagnetic pinned layer 15 and the soft magnetic free layer 13 in accordance with the magnetized states of the ferromagnetic pinned layer 15 and the soft magnetic free layer 13. Specifically, it is a Cu layer of the giant magnetoresistive layered film, an insulating layer made of alumina or magnesium oxide of the tunneling magnetoresistive layered film, or a current screen layer provided with a current confined layer in the CPP-GMR layered film.

The ferromagnetic pinned layer 15 is composed of a first ferromagnetic film 151, an antiparallel coupling layer 154, and a second ferromagnetic film 152, wherein the first ferromagnetic film 151 and the second ferromagnetic film 152 are antiferromagnetically coupled via the antiparallel coupling layer 154, and further, the first ferromagnetic film 151 is exchange-coupled to the antiferromagnetic film 11. This causes the ferromagnetic pinned layer 15 to be formed to have the magnetization substantially pinned to the magnetic field to be detected. Although such a configuration of the ferromagnetic pinned layer 15 does not directly contribute to the high resolution, the object of embodiments of the present invention, the configuration is widely used in the magnetic head technology, and is an example of a configuration according to one embodiment of the present invention.

Similarly, although not shown in the drawings, the soft magnetic free layer 13 can be a layered stack of two or more kinds of thin films, and in the typical configuration example, it is composed of a layered film of a CoFe alloy thin film and an NiFe alloy thin film from the non-magnetic intermediate layer 12.

The long distance antiparallel coupling layered film 17 has a thickness equal to or larger than 3 nanometers and within 20 nanometers, separates the soft magnetic free layer 13 and the differential soft magnetic free layer 16 to have a distance equal to the thickness of the long distance antiparallel coupling layered film 17, and at the same time, generates the antiferromagnetic exchange coupling force so that the mutual magnetization becomes antiparallel.

Figure 2:
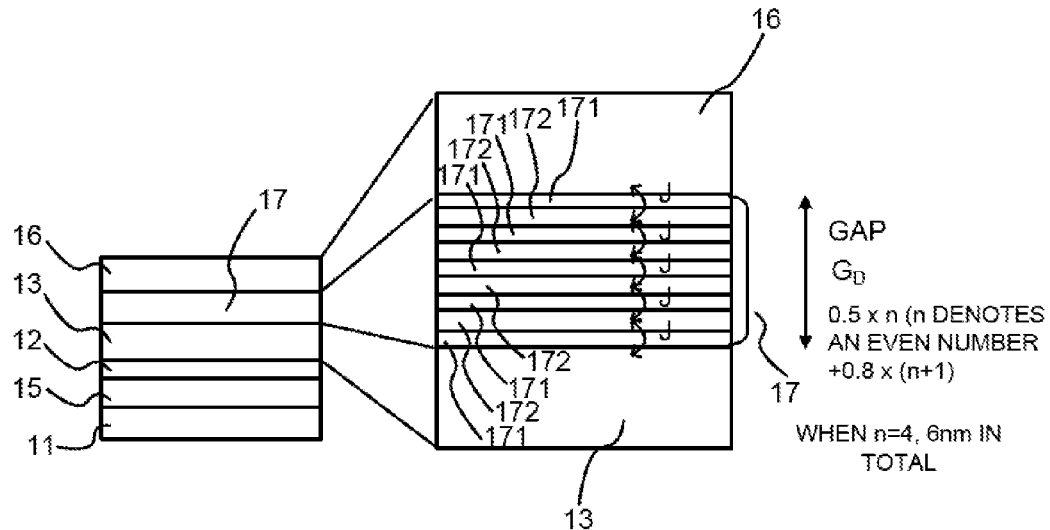
FIG. 2 is a diagram showing the layered structure of the magnetoresistive layered film according to the embodiment added with the detailed constructional example of the long distance antiparallel coupling layered film.

FIG. 2 shows the layered structure of the magnetoresistive layered film 10 according to an embodiment added with a detailed constructional example of the long distance antiparallel coupling layered film 17. Similarly to what is described with respect to FIG. 1, the magnetoresistive layered film 10 is formed by stacking, the antiferromagnetic film 11, the ferromagnetic pinned layer 15, the non-magnetic intermediate layer 12, the soft magnetic free layer 13, the long distance antiparallel coupling layered film 17, and the differential soft magnetic free layer 16. The configuration example enlarging the part thereof including the soft magnetic free layer 13, the long distance antiparallel coupling layered film 17, and the differential soft magnetic free layer 16, is shown in the right part of the drawing. An antiparallel coupling layer 171 is stacked so as to have contact with the soft magnetic free layer 13, and further an antiparallel magnetic layer 172 is stacked. The stacking of the antiparallel coupling layer 171 and the antiparallel magnetic layer 172 is repeated a plurality of times. In the configuration example of FIG. 2, the configuration with n=4 is shown. The long distance antiparallel coupling layered film 17 is composed of the (n+1) antiparallel coupling layers 171 and the n antiparallel magnetic layers 172 stacked alternately between the soft magnetic free layer 13 and the differential soft magnetic free layer 16. The antiferromagnetic coupling force (the arrows J in the drawing) is generated between the two magnetic layers (the soft magnetic free layer 13, the differential free layer 16 or the antiparallel magnetic layers 172) formed like a sandwich via each of the antiparallel coupling layers 171. By the n times of repetitions of the antiparallel coupling layer 171 and the antiparallel magnetic layer 172, the coupling force of the adjacent two magnetic layers is repeated in the thickness direction of the layered film, as a result, the antiferromagnetic coupling force urging the mutual magnetization to be arranged in an antiparallel manner can be made function between the soft magnetic free layer 13 and the differential soft magnetic free layer 16 stacked with a distance equal to or larger than 3 nanometers.

Figure 3A:
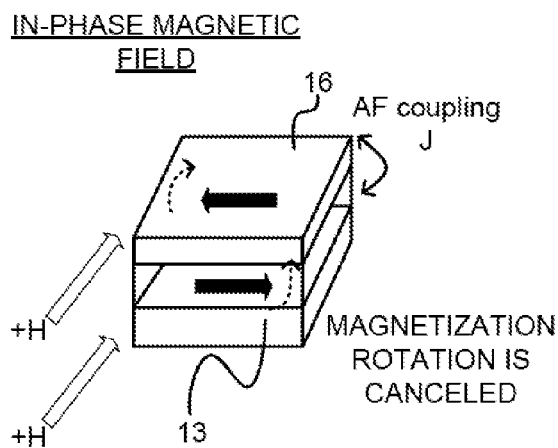
FIGS. 3A and 3B are diagrams showing the behavior of the soft magnetic free layer and the differential soft magnetic free layer corresponding to the in-phase magnetic field and the differential magnetic field.
Figure 3B:
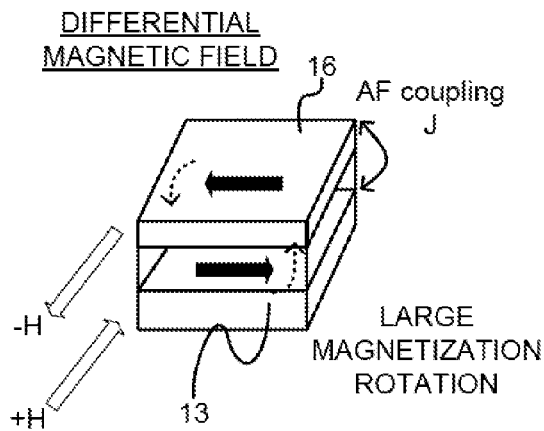

Hereinafter, the function of the antiferromagnetic coupling force will be explained with reference to FIGS. 3A-3B. FIGS. 3A and 3B are diagrams showing the action of the soft magnetic free layer 13 and the differential soft magnetic free layer 16 to the in-phase magnetic field and the differential magnetic field, respectively. Here, the in-phase magnetic field denotes the state in which the magnetic field having the same direction out of the positive and negative directions is applied to the soft magnetic free layer 13 and, the differential soft magnetic free layer 16, and similarly, the differential magnetic field denotes the case in which the magnetic fields with different signs out of the positive sign and the negative sign. In the state in which no magnetic field to be detected is applied, magnetizations of the soft magnetic free layer 13 and the differential soft magnetic free layer 16 are antiparallel to each other. This is because the antiferromagnetic exchange coupling force acts between the both layers via the long distance antiparallel layered film 17. In FIG. 3A, the state in which the magnetization of the soft magnetic free layer 13 faces to the right, and the magnetization of the differential soft magnetic free layer 16 faces to the left is defined as the initial state. The magnetic domain control structure causing such an initial state will be described later. The application direction of the magnetic field to be detected is the depth side (defined to be the positive side) of the sheet or the front side (defined to be the negative side).

Firstly, in explaining the case with the in-phase magnetic field (FIG. 3A), when the positive (in this drawing, in the depth direction of the sheet) magnetic field is applied to both of the soft magnetic free layer 13 and the differential soft magnetic free layer 16, the magnetization of the soft magnetic free layer 13 is urged to rotate counterclockwise by the applied magnetic field (+H). At the same time, the magnetization of the differential soft magnetic free layer 16 is urged to rotate clockwise by the applied magnetic field (+H). Since the both layers are coupled by the antiferromagnetic exchange coupling force via the long distance antiparallel coupling layered film 17 so that the mutual magnetization directions become antiparallel, the counterclockwise and clockwise actions cancel each other, and the magnetization rotations of the soft magnetic free layer 13 and the differential soft magnetic free layer 16 are thus canceled.

Subsequently, the case with the differential magnetic field will be explained (FIG. 3B). In the case in which the positive magnetic field is applied to the soft magnetic free layer 13 and the negative magnetic field is applied to the differential soft magnetic free layer 16, the magnetization of the soft magnetic free layer 13 is urged to rotate counterclockwise by the applied magnetic field (+H). Similarly, the magnetization of the differential soft magnetic free layer 16 is urged to also rotate counterclockwise by the applied magnetic field (−H). Although the both layers are coupled by the antiferromagnetic exchange coupling force via the long distance antiparallel coupling layered film so that the mutual magnetization directions become antiparallel, since the both actions are in counterclockwise directions, magnetization rotations of the soft magnetic free layer 13 and the differential free soft magnetic free layer 16 are caused, and as a result, a large magnetoresistance change is caused in response to the differential magnetic field.

As described above, the magnetoresistive layered film according to one embodiment is provided with the soft magnetic free layer and the differential magnetic free layer antiferromagnetically coupled with each other, thus differentially acting to the magnetic field to be detected.

Figure 4:
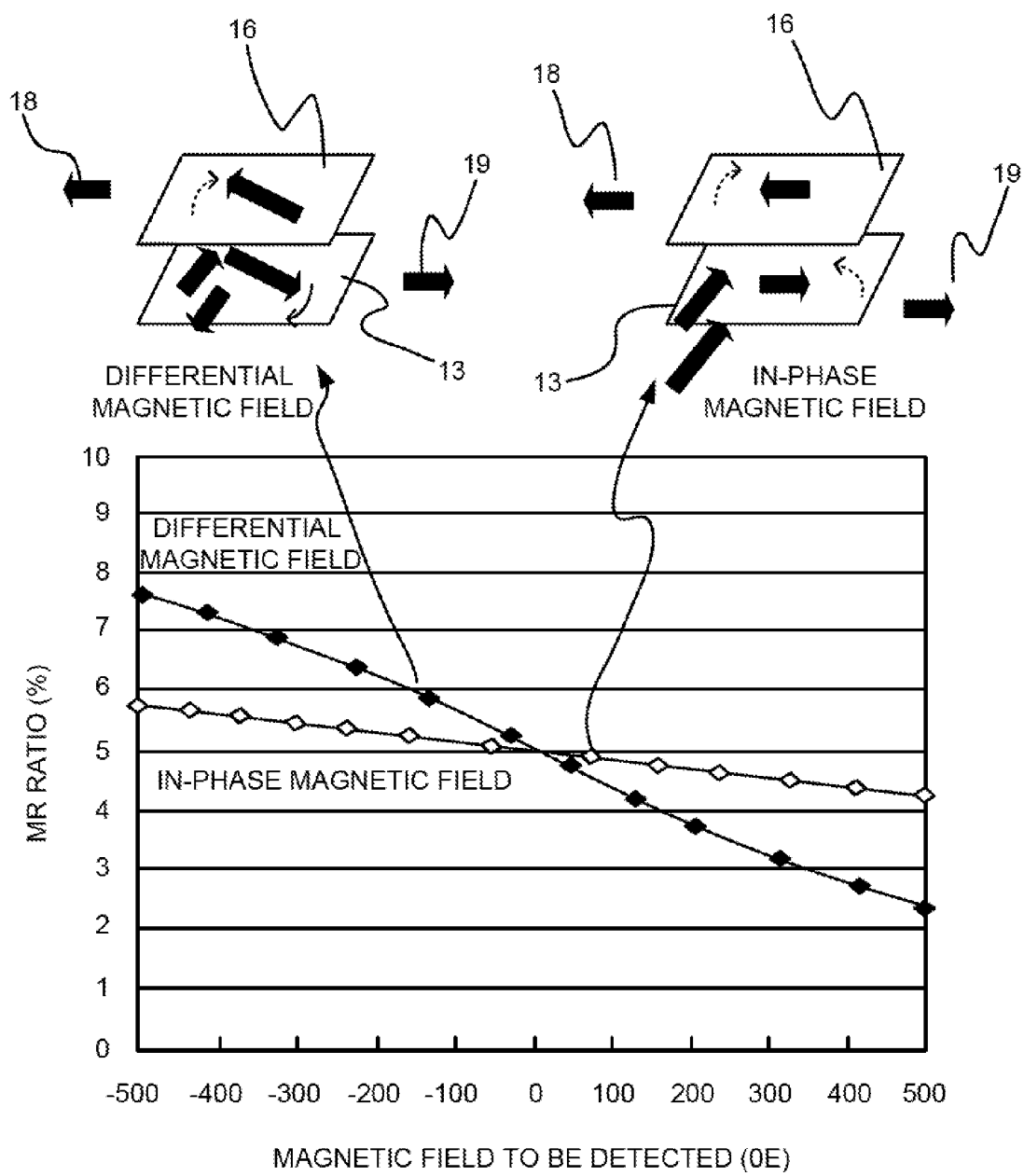
FIG. 4 is a diagram showing the signal characteristic of the differential magnetic head according to an embodiment obtained by the Stoner-Wohlfarth model magnetizing process calculation.

FIG. 4 shows the signal characteristic of the differential magnetic head having the magnetoresistive layered film described above built-in obtained by the Stoner-Wohlfarth model magnetizing process calculation. In the calculation, the magnetoresistance change in the case with the in-phase magnetic field in which the magnetic fields to be detected with the same sign are applied respectively to the soft magnetic free layer 13 and the deferential soft magnetic free layer 16, and the magnetoresistance change in the case with the differential magnetic field in which the magnetic fields to be detected with reversed signs from each other are respectively applied to the both layers are calculated. Although the antimagnetic field in the end sections of the sensor is not considered in the present calculation, there is executed the calculation of applying the magnetic domain controlling bias magnetic fields of 800 Oersted to the soft magnetic free layer) 3 and the differential soft magnetic free layer 16 respectively in the directions of the arrows 19 and 18 in the drawing in order for maintaining the initial state of the magnetized state stable. Here, it is assumed that J=−1 erg/cm2 and the maximum magnetoresistance ratio of the sensor is 10%. In the drawing, the symbol ◇ (open rhombus) shows the magnetoresistance change in the case with the in-phase magnetic field, and the output corresponding to the in-phase magnetic field is not completely zero. This becomes zero when the antiferromagnetic coupling magnetic field between the soft magnetic free layer 13 and the differential soft magnetic free layer 16 is infinitely large, and the higher antiferromagnetic coupling magnetic field can be obtained, the closer to zero the output in the in-phase magnetic field can be made. On the other hand, the symbol ◆ (filled rhombus) is the magnetoresistance change in the differential magnetic field, which is several times as large as the output corresponding to the in-phase magnetic field. This is because, as explained with reference to FIGS. 3A and 3B, it is configured that the magnetizations of the soft magnetic free layer 13 and the differential soft magnetic free layer 16 rotate in accordance with the differential magnetic field.

Figure 7:
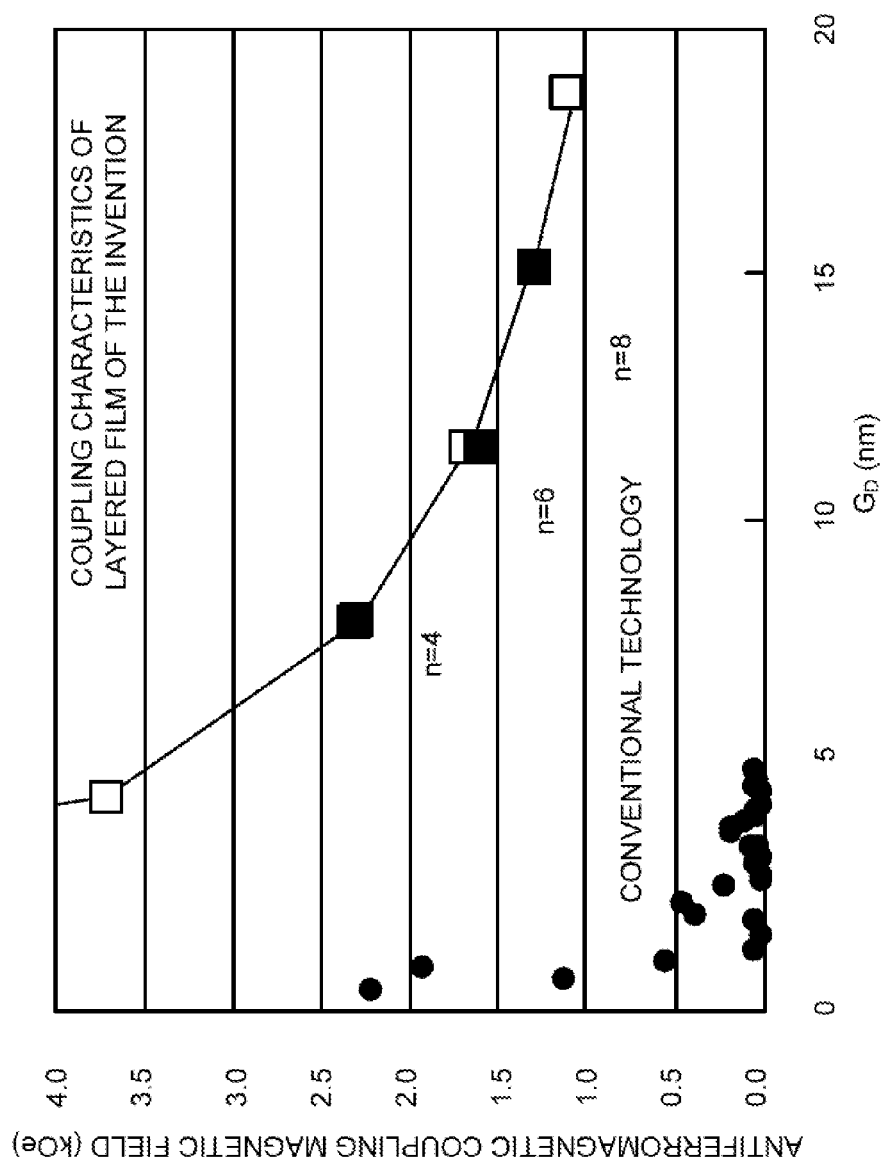
FIG. 7 is a diagram showing the $G_D$ dependence of the antiferromagnetic coupling magnetic field with the long distance antiparallel coupling layered film.

Subsequently, the distance between the soft magnetic free layer 13 and the differential soft magnetic free layer 16 of the magnetoresistive layered film 10, and the long distance antiparallel coupling layered film 17 will be explained. In the conventional technologies, there is known an application technology of the magnetic films having mutual magnetizations antiferromagnetically coupled to each other. For example, as a similar conventional structure, Japanese Patent Publication No. 2002-151758 ("Patent Document 4") has a description of a magnetic recording system using a soft magnetic free layer, a so-called synthetic ferri-magnet-free layer, composed of two magnetic layers antiferromagnetically coupled with each other. One of the differences of the configuration of embodiments of the present invention from the conventional technologies described above is the distance of the coupling between the layers. In the conventional technologies, the two magnetic layers antiferromagnetically coupled with each other are exchange-coupled via a single antiparallel coupling film. In FIG. 7 of U.S. Pat. No. 5,408,377 ("Patent Document 5"), there is described the thickness dependency of Ru in the case in which Ru is used as the antiparallel coupling film, and according thereto, a strong antiferromagnetic coupling magnetic field of equal to or greater than 1 kilo-Oersted is observed with the distance between the two free layers of equal to or shorter than 1 nanometer (10 angstroms). On the other hand, with the Ru thickness of 2 nanometers (20 angstroms), a weak antiferromagnetic coupling magnetic field of smaller than 500 Oersted is observed. Similarly, also in the case with the thickness of equal to or greater than 3 nanometers (30 angstroms), FIG. 7 of Patent Document 5 describes the observation result of the anti-ferromagnetic coupling magnetic field denoted as AF, and the amplitude of the anti ferromagnetic coupling magnetic field can be read from the drawing as a value equal to or smaller than 50 Oersted.

Therefore, in the case in which the strong exchange coupling greater than, for example, 1 kilo-Oersted is required, the distance between the two magnetic layers to be antiferromagnetically coupled with each other should be narrower than 3 nanometers in the conventional technology of Patent Document 5. Although some improvement can be obtained on the amplitude of the antiferromagnetic exchange coupling by devising the thickness of the magnetic layer, or the material or the manufacturing method of the antiparallel coupling film, the practical method of obtaining the antiferromagnetic exchange coupling magnetic field stronger than 1 kilo-Oersted in the case in which the thickness of the antiparallel coupling film becomes equal to or greater than 3 nanometers is not achievable by the conventional technology. Further, it is also a structural difference from Patent Document 5 that the long distance antiparallel coupling layered film having the multilayer structure as shown in FIG. 2 is included in embodiments of the present invention for realizing the antiferromagnetic exchange coupling with the distance between the soft magnetic free layer and the differential soft magnetic free layer in a range from 3 nanometers to 20 nanometers. These structural differences result in a significant difference in the function of the magnetic head.

FIG. 5 is a diagram explaining the distance between the soft magnetic free layer and the differential soft magnetic free layer in the magnetoresistive layered film according to the embodiment. Hereinafter, the distance between the soft magnetic free layer 13 and the differential soft magnetic free layer 16 is referred to as $G_D$. $G_D$ corresponds to the thickness of the long distance antiparallel coupling layered film 17. Therefore. $G_D$ is represented by the following formula with the thickness $t_M$ of the antiparallel magnetic layer 172 of the long distance antiparallel coupling layered film 17, the number of times n (n is an even number equal to or larger than 2) of stacking, and the thickness $t_{AF}$ of the antiparallel coupling layer 171.

$$G_D = t_M \times n + t_{AF} \times (n+1)$$

Assuming that n=6, $t_M$=0.5 nm, and $t_{AF}$=0.8 nm as a typical value, it makes $G_D$=8.6 nm. In view of the fact that the recording density in the hard disk magnetic recording device in recent years is around 100 Gb/in$^2$, and further reaches the demonstration of 300 Gb/in$^2$, it is conceivable that it is appropriate to describe the length of a single magnetic bit as 20 nm or longer in the explanation of embodiments of the present invention.

Figures 5A, 5B:
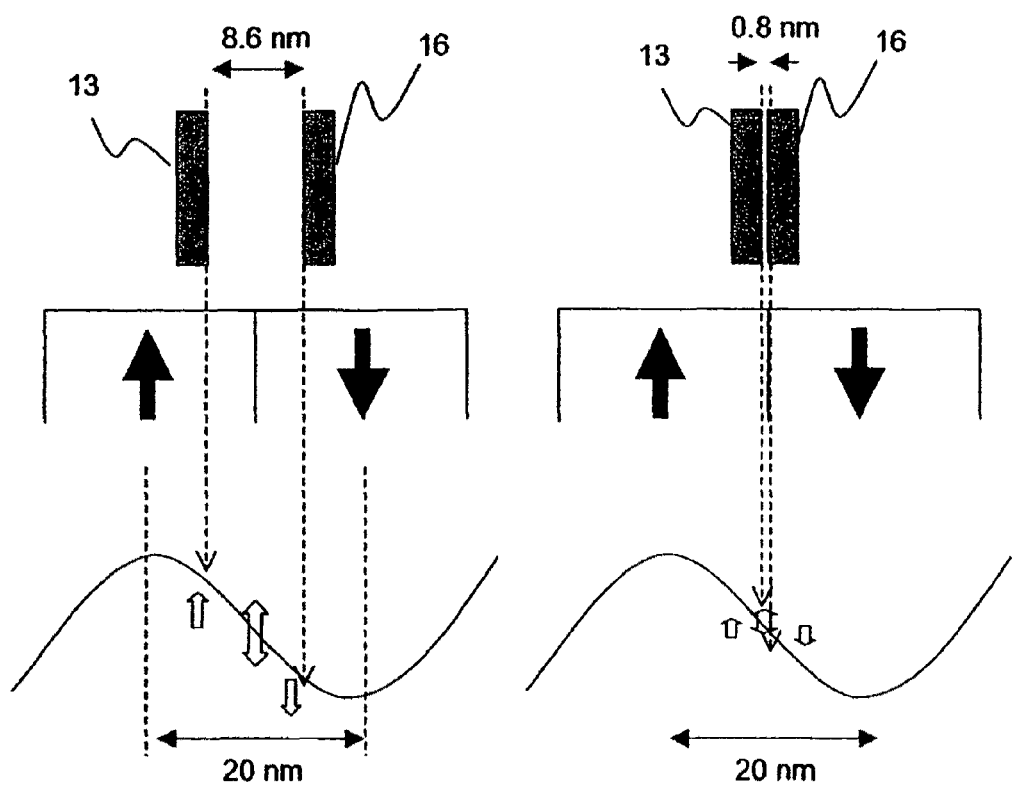
FIGS. 5(a) and 5(b)a are diagrams for explaining the distance between the soft magnetic free layer and the differential free layer in the magnetoresistive layered film according to an embodiment.

In FIG. 5(a), the spatial distribution of the magnetic field to be detected by the magnetic head, and which leaks from the medium, is described conceptually on a wavy line. The magnetic field distribution described above varies in accordance with the length of the magnetic bit. In the case in which the distance $G_D$ between the soft magnetic free layer 13 and the differential soft free layer 16 is set to be 8.6 nm as shown in FIG. 5(a), the magnetic field sensed by the soft magnetic free layer 13 and the magnetic field sensed by the differential soft magnetic free layer 16 are significantly different from each other. In other words, it proves that a large differential output of the soft magnetic free layer 13 and the differential soft magnetic free layer 16 can be obtained. This is because $G_D$ is appropriately large with respect to the length of 20 nm of the magnetic bit. Here, the reason why it is appropriately large is that if $G_D$ is longer than the length (20 nm) of the magnetic bit, the position of the magnetic field sensed by each of the magnetic layers exceeds one cycle of the wavy magnetic field distribution, and as a result, the wavelength component corresponding to one bit cannot correctly be reproduced from the sensible magnetic field distribution. The example of the case in which $G_D$ is shorter, on the contrary, is shown in FIG. 5(b). In the case in which the long distance antiparallel coupling layered film is not used, it is assumed that the two magnetic layers (these are assumed to be referred to as the soft magnetic free layer 13 and the differential soft magnetic free layer 16 here with the same index as in the embodiment) antiparallel coupled with each other are disposed with a distance corresponding to one antiparallel coupling film (0.8 nm thick). It proves that since the distance between the both layers is extremely narrow, the magnetic field detected by the soft magnetic free layer 13 and the magnetic field detected by the differential soft magnetic free layer 16 are substantially the same, and consequently, an extremely small differential output can only be obtained. As described above, it is important to set the distance between the soft magnetic free layer and the differential soft magnetic free layer, which are made perform the differential operation in the configuration of the embodiment, appropriately long within the range of not exceeding the upper limit by the recording density and within the range of obtaining sufficiently strong antiferromagnetic coupling force.

Figure 6:
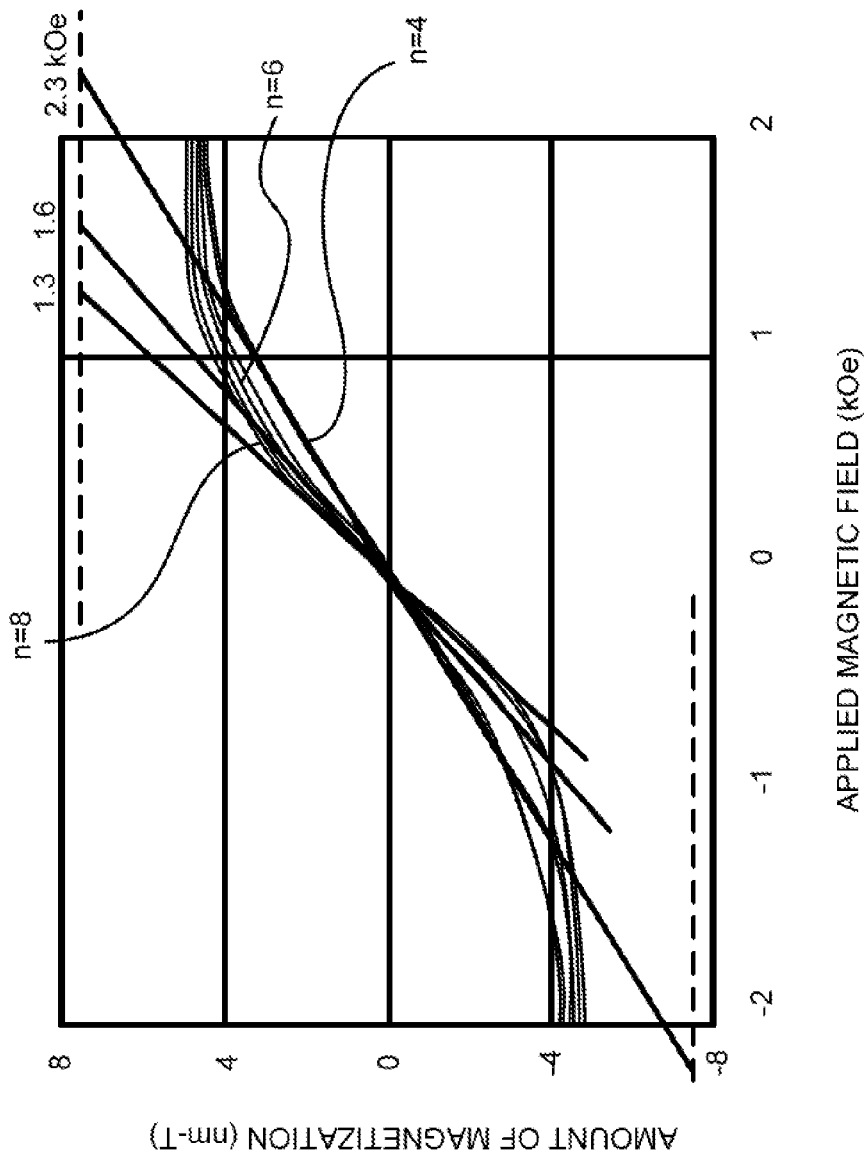
FIG. 6 is a diagram showing a part of the magnetization curve of the magnetoresistive layered film according to an embodiment thus manufactured.

FIG. 6 is a diagram showing a part of the magnetization curve of the magnetoresistive layered film thus manufactured according to an embodiment of the present invention. The minor loop with the applied magnetic field of −2 kilo-Oersted through 2 kilo-Oersted is measured, and it can be regarded as the part corresponding to the magnetization curve of the soft magnetic free layer, the differential soft magnetic free layer, and the long distance antiparallel coupling layered film rather than the magnetization curve of the ferromagnetic pinned layer. The layer configuration of the magnetoresistive layered film is as follows. The substrate/the underlayer film/MnIr (7.5 nm)/CoFe (4 nm)/Ru (0.8 nm)/CoFe (4 nm)/Cu (2 nm) or the current screen layer (roughly 2 nm)/CoFe (0.5 nm)/NiFe (2 nm)/CoFe (0.5 nm)/Ru (0.8 nm)/[CoFe (1 nm)/Ru (0.8 nm)] n/CoFe (0.5 nm)/NiFe (2 nm)/CoFe (0.5 nm)/the protective layer. In the drawing, the magnetization curves with n=4, 6, and 8 are shown. In all of the magnetization curves with n=4, 6, and 8, the behavior of gently magnetizing in accordance with the applied magnetic field is observed, and it proves that the part corresponding to the soft magnetic free layer, the differential soft magnetic free layer, and the long distance antiparallel coupling layered film in these layered films is exchange-coupled antiferromagnetically. In observing the antiferromagnetic coupling magnetic field, the magnetic field corresponding to the strength with which it is saturated to the maximum magnetization amount determined by the saturated magnetic flux density, by extrapolating the magnetization curve in the vicinity of the zero magnetic field for each of the magnetization curves, roughly 2.3 kilo-Oersted, 1.6 kilo-Oersted, and 1.3 kilo-Oersted are obtained respectively for n=4, 6, and 8. The thicknesses ($G_D$) of the long distance antiparallel coupling film in these cases are 8, 11.6, and 15.2 nanometer, respectively.

The dependency of the antiferromagnetic coupling magnetic field on the thickness $G_D$ of the long distance antiparallel coupling layered film is shown in FIG. 7. For the comparison with the conventional technology, the numerical values in FIG. 7 of Patent Document 5 are shown in the drawing. It is understood that although in the conventional technology, what corresponds to $G_D$ is the distance between the two magnetic layers, which is the thickness of the antiparallel coupling film such as Ru, the antiferromagnetic coupling force is extremely and rapidly lowered as the thickness increases. Therefore, it proves that it is not achievable by the conventional technology to, for example, set the distance between the two magnetic layers to be equal to or greater than 3 nanometers, and at the same time, to set the antiferromagnetic exchange coupling magnetic field to be equal to or greater than 1 kilo-Oersted. Similarly, it is also not achievable to set the distance between the two magnetic layers to be equal to or greater than 5 nanometers, and at the same time, to set the antiferromagnetic exchange coupling magnetic field to be equal to or greater than 1 kilo-Oersted. In contrast, according to the coupling characteristic of the long distance antiparallel coupling layered film of the present invention represented by the embodiments described above, as is obvious from the drawings, the antiferromagnetic coupling magnetic field greater than 2 kilo-Oersted can be maintained even if $G_D$ is as large as 8 nanometers.

Figure 8:
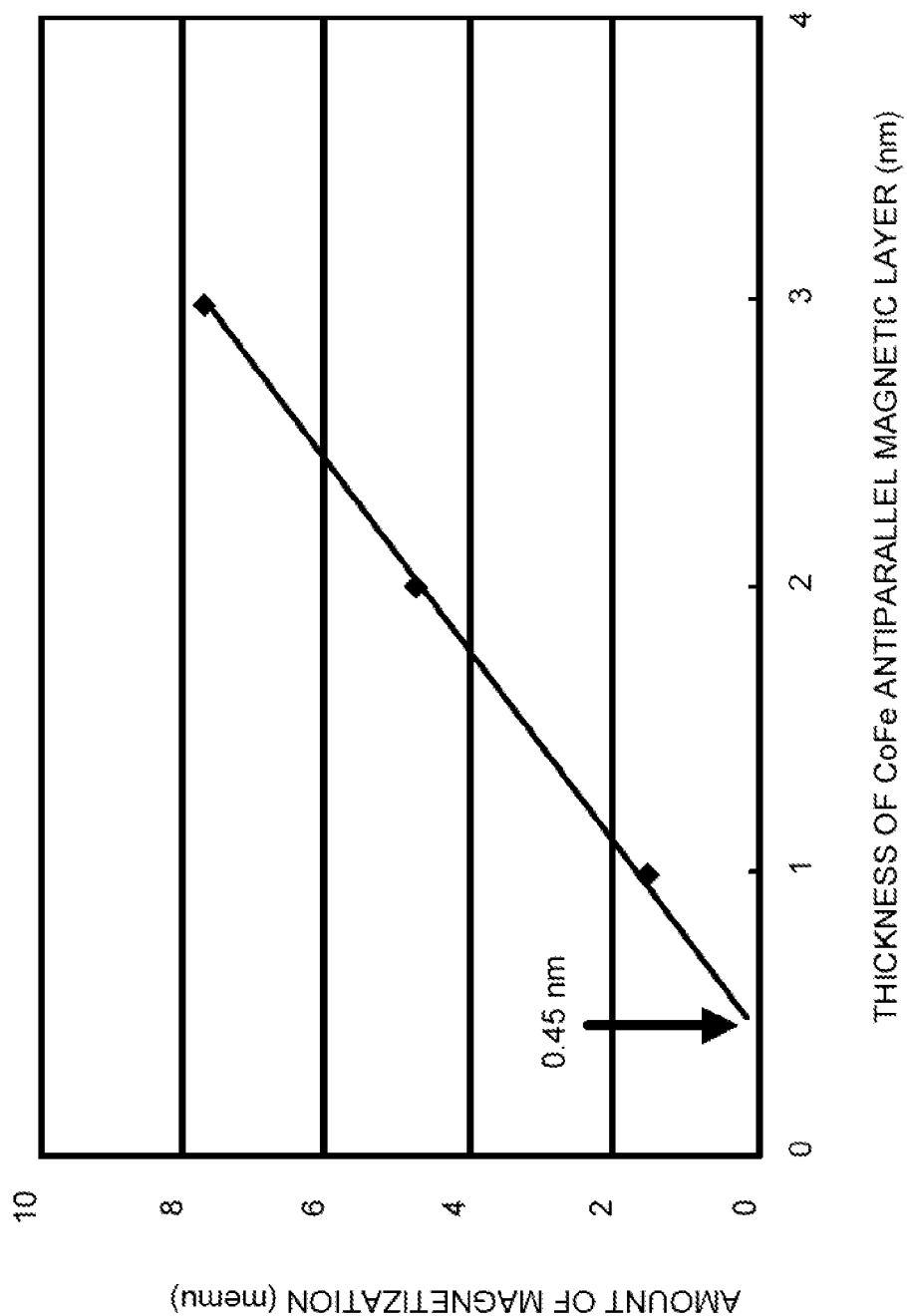
FIG. 8 is a diagram showing the amount of magnetization of the long distance antiparallel coupling layered film in the case of varying the thickness of the antiparallel magnetic layer.

Subsequently, the thickness of the antiparallel magnetic layer 172 of the long distance antiparallel coupling layered film 17 will be described. FIG. 8 is a diagram showing the amount of magnetization of the layered configuration in the case of varying the thickness of the antiparallel magnetic layer 172. Here, as the amount of magnetization, there is shown the amount of magnetization of the part corresponding to the antiparallel magnetic layer 172 obtained by subtracting the amount of the magnetization of the ferromagnetic pinned layer and the differential soft magnetic free layer from the amount of magnetization of the entire layered configuration. The configuration with n=6 is used for the experiment. As the thickness of the antiparallel magnetic layer 172 is increased, the amount of magnetization monotonically increases. This is simply because the amount of magnetization of the antiparallel magnetic layer 172 increases in accordance with the thickness. However, when the rise curve is extended to the thinner side of the antiparallel magnetic layer 172, the amount of magnetization becomes zero prior to the thickness of the antiparallel magnetic layer 172 becomes zero. This is because the extremely thin part of the antiparallel magnetic layer 172 has contact with the adjacent antiparallel coupling layer 171, thus decreasing the magnetization, and a so-called dead layer is formed. The thickness of the dead layer is about 0.45 nm according to the drawing and therefore, it proves that each of the interfaces (a half thereof since it is per interface) of each of the antiparallel magnetic layer 172 has the dead layer of about 0.23 nm thick (roughly one layer of atoms). In order for provide the antiferromagnetic coupling force to the long distance antiparallel coupling layered film 17, it is required for each of the antiparallel magnetic layers 172 to keep the ferromagnetic state. Therefore, the thickness of the antiparallel magnetic layer 172 is preferably equal to or greater than 0.5 nm.

Figure 9:
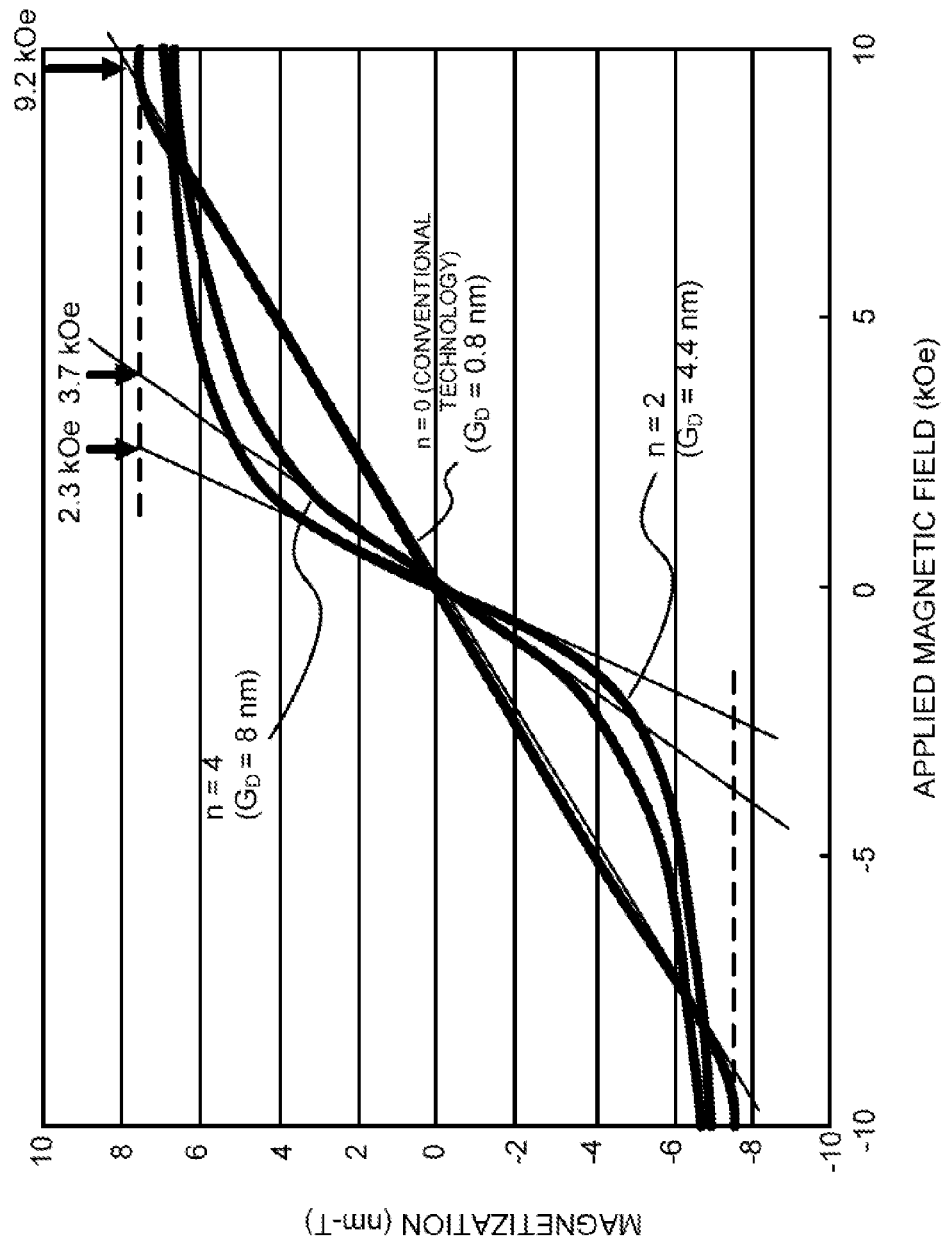
FIG. 9 is a comparison diagram of the calculation results of the magnetization curves of the conventional technology and the embodiments of the present invention.
Figure 10:
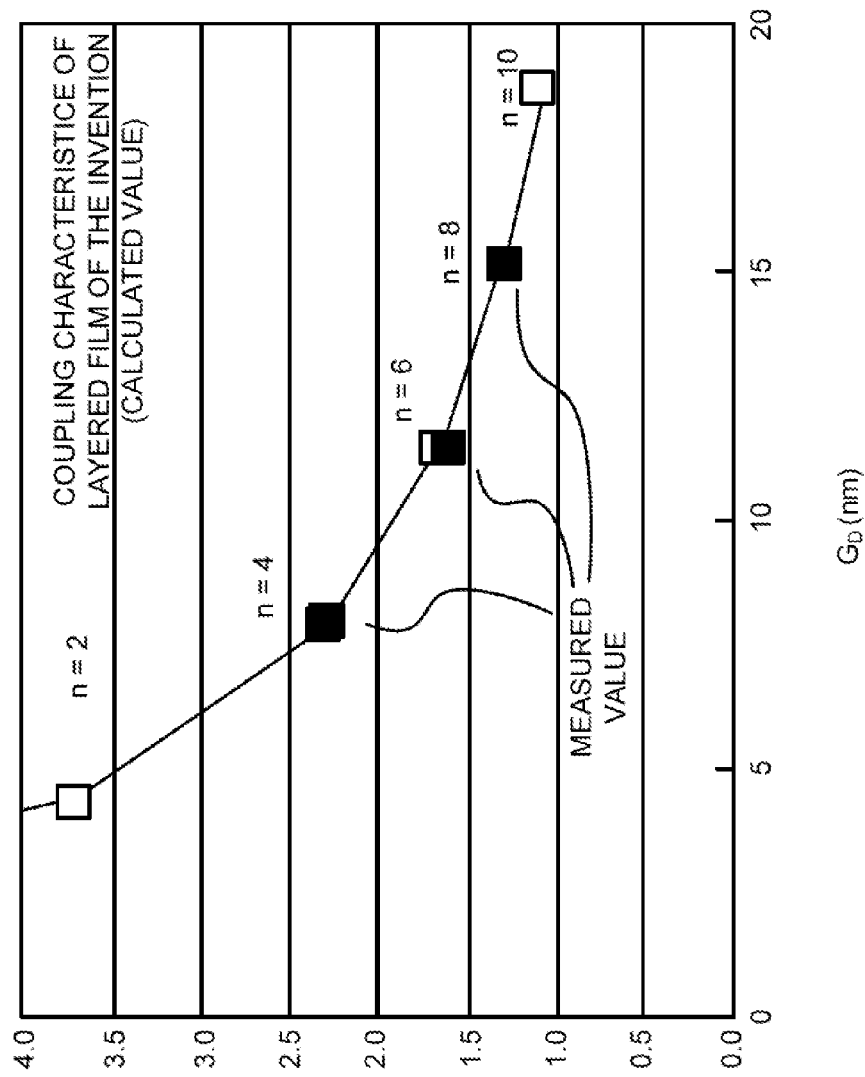
FIG. 10 is a diagram showing the antiferromagnetic coupling magnetic field with respect to $G_D$ when n is varied from 2 to 10.

FIG. 9 shows a comparison of the calculation results of the magnetization curves of the long distance antiparallel coupling layered film 17 in the conventional technology and in the embodiment, respectively. In the calculated configuration, it is assumed that n=2 and 4, the thickness of the antiparallel magnetic layer is 1 nm (note that the amount of magnetization corresponding to the dead layer of 0.45 nm is reduced), the exchange coupling energy of each of the antiparallel coupling layer is −1.4 erg/cm2 (−0.14 J/m$^2$). The conventional technology corresponds to n=0, and $G_D$ is as extremely short as 0.8 nm although the antiferromagnetic coupling magnetic field is as large as 9.2 kilo-Oersted. As increasing $G_D$ by increasing n from 2 to 4, the antiferromagnetic coupling magnetic field remains in a large value although decreasing gradually from 3.7 kilo-Oersted to 2.3 kilo-Oersted. In FIG. 10, the antiferromagnetic coupling magnetic field when n is varied from 2 to 10, is shown with respect to $G_D$. The result by the model calculation matches well with the measurement result of the layered film with n=4, 6, and 8 also shown in FIG. 7, and it proves that the antiferromagnetic coupling magnetic field of the layered film of the embodiment can realize the desired antiferromagnetic coupling magnetic field with the appropriate distance in view of the magnetic energy calculation by appropriately setting the number of stacked layers and the thickness. An increase in the number of the stacked layers leads to an increase in the distance between the soft magnetic free layer and the differential soft magnetic free layer, and at the same time, to a decrease in the exchange coupling force in accordance with an increase in the number of stacked layers. Further, since it becomes difficult to manufacture an extremely planer layered structure for obtaining the antiferromagnetic coupling force as the thickness of the layered film increases, the thickness $G_D$ of the long distance antiparallel coupling layered film 17 is preferably smaller than 20 nanometers.

Figure 11:
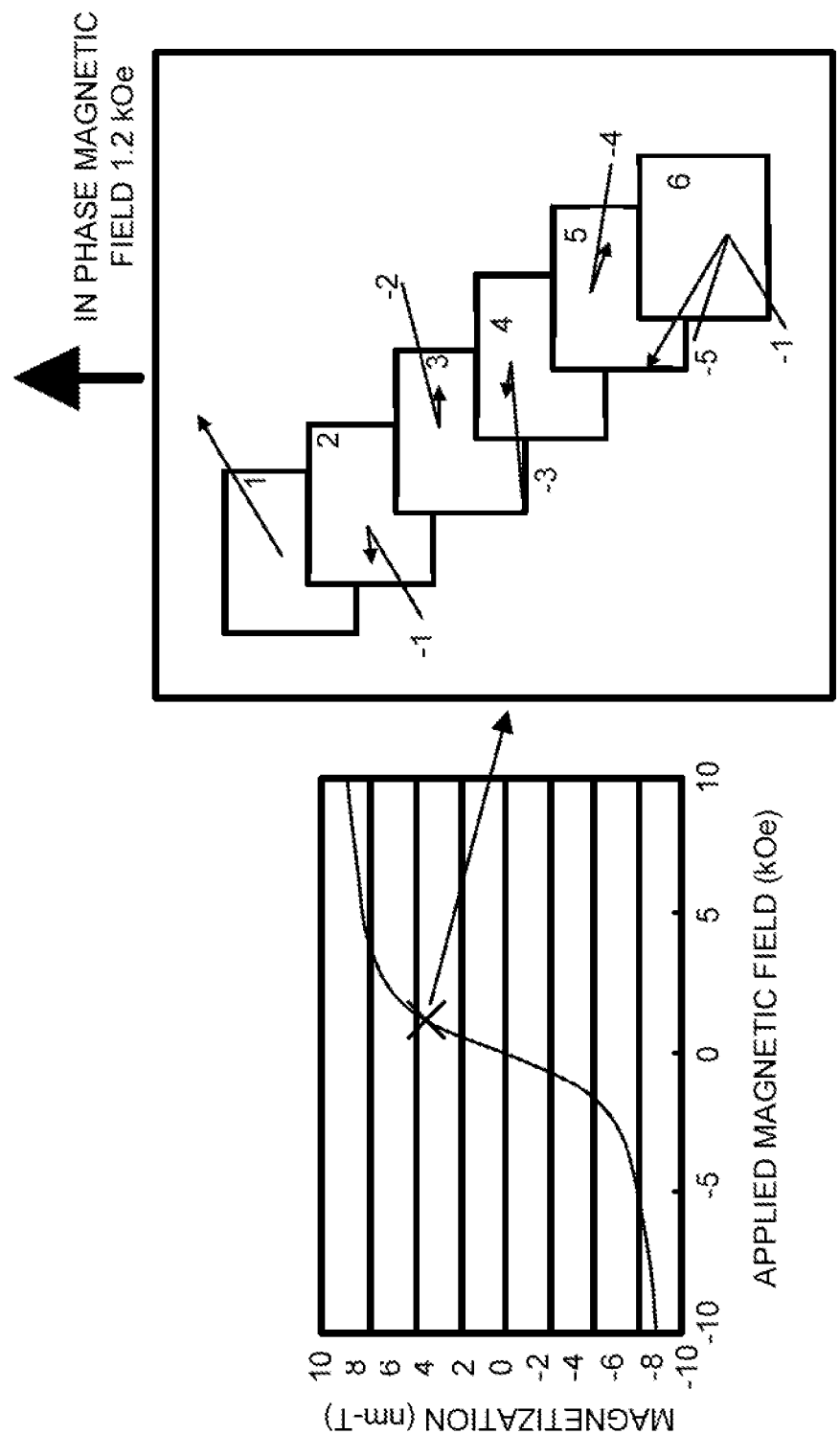
FIG. 11 is a diagram showing the magnetized state when n=4 and applied magnetic field is 1.2 kilo-Oersted.

FIG. 11 shows the magnetized state when n=4, and applied magnetic field is 1.2 kilo-Oersted. This is the case corresponding to the X mark in the left drawing of FIG. 11. In the right drawing of FIG. 11 the numbers of 1 through 6 are provided sequentially to totally 6 magnetic layers, specifically, the soft magnetic free layer, the antiparallel magnetic layers, and the differential soft magnetic free layer, and the arrows show the directions of the magnetizations of the respective magnetic layers (the length of the arrow is proportional to the amount of magnetization). Further, regarding the dotted lines provided with the numbers of −1 through −5 the direction at an angle of 180 degrees with the direction of the magnetization of the Mth magnetic layer is illustrated with the dotted line denoted with −M. By comparing the directions of the dotted lines and the respective arrows, it proves that the directions of the magnetizations of the 6 magnetic layers each have angle of about 10° with the dotted line, in other words, the 180 degree direction of the magnetization direction of the adjacent anterior magnetic layer. Meanwhile, the magnetization of the soft magnetic free layer and the magnetization of the differential soft magnetic free layer, namely the directions of the arrows in 1 and 6 in the right drawing of FIG. 11, have an angle of about 60° from the 180° reversed direction. In other words, approximately, the angle (60°) between the magnetization of the soft magnetic free layer and the magnetization of the differential soft magnetic free layer is distributed roughly equally (60°/5=12°, roughly 10°) to the n+1 interfaces between the n=4 antiparallel magnetic layers. This is because since the exchange coupling energy acting between the two magnetic layers acts in a cosine manner, by distributing the angle between the soft magnetic free layer and the differential soft magnetic free layer among the n+1 interfaces to assimilate the angle, the magnetic energy derived from the antiferromagnetic exchange coupling can be reduced. As a result, by interposing the long distance antiparallel coupling layered film having the layered configuration with n layers, it becomes possible to increase the distance between the soft magnetic free layer and the differential soft magnetic free layer, and at the same time, to suppress the reduction of the antiferromagnetic coupling magnetic field caused by increases in the distance between the two layers to the minimum.

As one appreciable affair, distribution of the amount of magnetization can be cited. As shown in FIG. 4, in the configuration of the embodiments described above, the configuration of generating the output in the differential operation and not generating the output in the in-phase magnetic field is the target. As the configuration for realizing the above, it is configured so that the amounts of magnetization (product of the saturated magnetization and the thickness) of the soft magnetic free layer and the differential soft magnetic layer are substantially the same without a large difference. This is easy to understand if it is compared with the configuration of Patent Document 5, and in Patent Document 5, the two magnetic layers antiferromagnetically coupled with each other and having a difference in the amount of magnetization are used as a single free layer with the differential amount of magnetization. In contrast, in the embodiments described above, by arranging the difference in the amount of magnetization between the soft magnetic free layer and the differential soft magnetic free layer to be approximately zero, it is arranged that the output corresponding to the in-phase magnetic field is reduced and to obtain only the differential output. The same applies to the antiparallel magnetic layer, it is configured that each of the antiparallel magnetic layers is arranged in an antiparallel manner with the adjacent so that the total amount of the magnetizations is approximately zero. To put it simply, by arranging that the n antiparallel magnetic layers have the same amount of magnetization, since n is an even number, as a result of the antiparallel arrangement, the total amount of magnetization can be set to zero.

Figure 12:
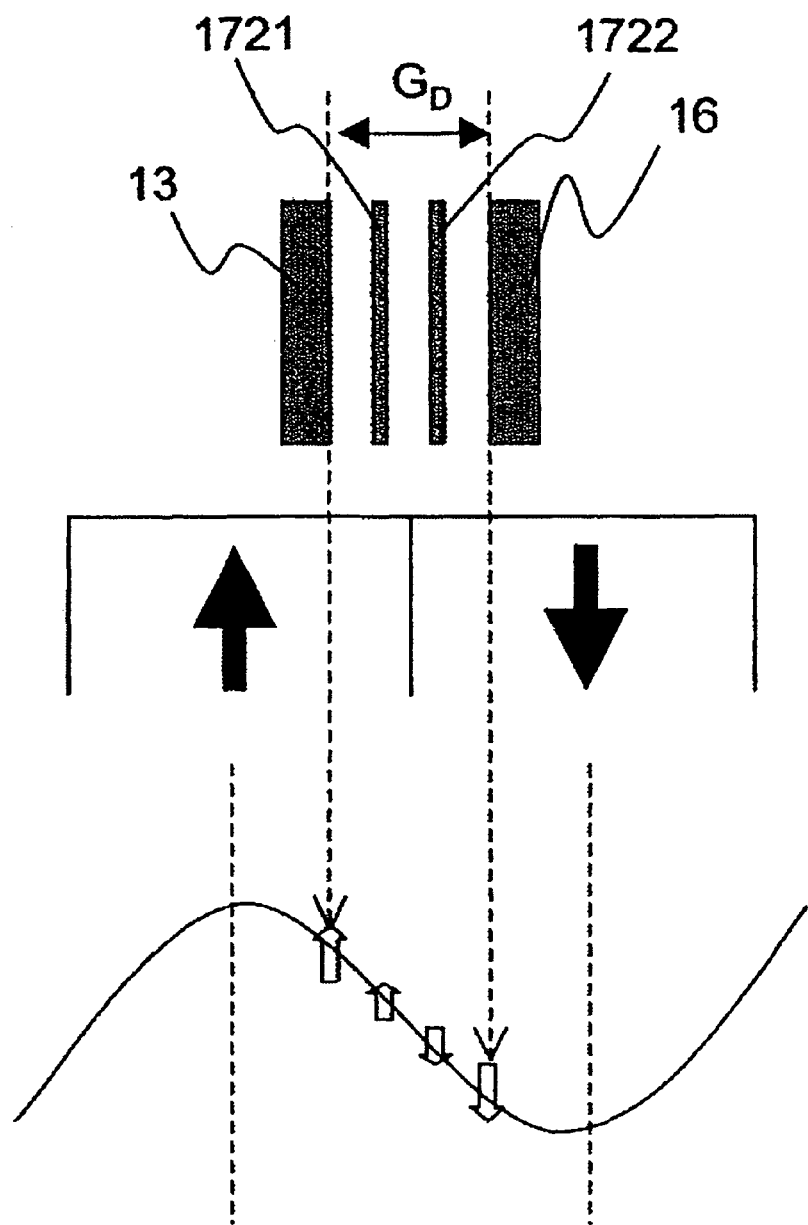
FIG. 12 is a conceptual diagram of the operation of the differential magnetic head of an embodiment of the present invention.

Subsequently, the thickness of the antiparallel magnetic layer and the upper limit of the amount of the magnetization will be described. FIG. 12 is a conceptual diagram of an operation of a differential magnetic head having the magnetoresistive layered film according to the embodiment described above built-in. For the sake of simplicity, the case with n=2 is shown. A part of the magnetic field to be detected is applied to each of the antiparallel magnetic layer 1721 on the side near to the soft magnetic free layer 13 and the antiparallel magnetic layer 1722 on the side near to the differential soft magnetic free layer 16. The antiparallel magnetic layers 1721, 1722 are antiferromagnetically coupled to the soft magnetic free layer 13, the differential soft magnetic free layer 16, and as a result, the magnetic field applied to the antiparallel magnetic layers 1721 and 1722 has contribution to the output of the magnetic head. In the case as shown in the drawing, the upward magnetic field is applied to the soft magnetic free layer 13, and the upward magnetic field is also applied to the adjacent antiparallel magnetic layer 1721 although the amount thereof is reduced. Since the soft magnetic free layer 13 and the antiparallel magnetic layer 1721 are antiferromagnetically coupled with each other, the soft magnetic free layer 13 and the antiparallel magnetic layer 1721 are to act differentially to the application of the magnetic fields with the same directions, and as a result, the operation of the magnetization of the soft magnetic free layer 13 and the antiparallel magnetic layer 1721 is partially canceled. The same phenomenon occurs in the differential free magnetic layer 16 and the antiparallel magnetic layer 1722. Therefore, in order for efficiently performing the differential operation, it is preferable that the magnetostatic contributions of the antiparallel magnetic layers 1721 and 1722 are reduced. In other words, it is preferable that the amount of magnetization of the antiparallel magnetic layer is set lower to the amount of magnetization of the soft magnetic free layer 13 and the differential soft magnetic free layer 16, namely the product (the total thereof in the case with the stacked magnetic layer) of the saturated magnetization and the thickness. This is because since the magnetostatic energy of the magnetization to the magnetic field is the product of the amount of magnetization and the magnetic field, by reducing the amount of magnetization, the contribution of the antiparallel magnetic layer to the magnetic field to be detected can be reduced. As explained in FIG. 8, the lower limit of the thickness of the antiparallel magnetic layer is 0.5 nanometers because of having the dead layer, and the upper limit for the reason described above is the thickness (4 nanometers) with which the amount of magnetization becomes equal to or smaller than the amount of magnetization of the soft magnetic free layer and the differential soft magnetic free layer. In the case in which the amount of magnetization of the antiparallel magnetic layer is the same as those of the soft magnetic free layer and the differential soft magnetic free layer, it is a little bit more complicated. The antiparallel magnetic layer indispensably has the adjacent magnetic layers (the antiparallel magnetic layer, the soft magnetic free layer, or the differential magnetic free layer) coupled in an antiparallel manner on both sides in the thickness direction, and inevitably cancels the magnetic charge of the adjacent magnetic layer at the end portion of the magnetic head coming closer to the recording medium. On the other hand, since the soft magnetic free layer and the differential soft magnetic free layer each have a antiparallel magnetic layer on only one side in the thickness direction, canceling of the magnetization at the end portion with the adjacent antiparallel magnetic layer has a half effect. Therefore, in the case in which the amounts of magnetization of the soft magnetic free layer and the differential soft magnetic free layer and the amount of magnetization of the antiparallel magnetic layer are the same, the effect of raising the sensitivity of the magnetization of the soft magnetic free layer and the differential soft magnetic free layer to be higher than that of the antiparallel magnetic layer is caused, and it is conceivable that the case in which the amount of magnetization of the antiparallel magnetic layer is the same as those of the soft magnetic free layer and the differential soft magnetic free layer is the upper limit therefor to function as the differential head.

Figure 13:
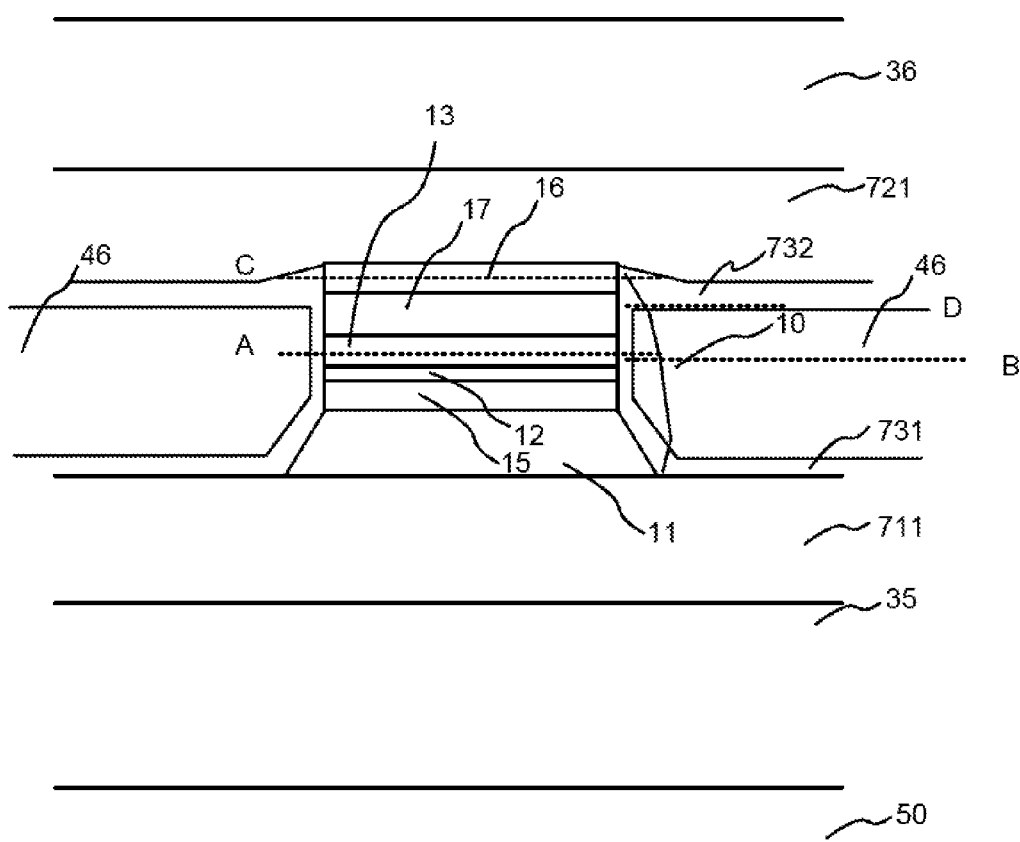
FIG. 13 is a diagram showing the constructional example of the differential magnetic head of an embodiment of the present invention.

FIG. 13 is a constructional example of the differential magnetoresistive magnetic head according to an embodiment of the present invention. It is a drawing viewed from the surface facing the magnetic recording medium. It is configured by forming a lower magnetic shield-cum-electrode 35, a lower electrically conductive gap 711, the magnetoresistive layered film 10, an upper electrically conductive gap 721, and an upper magnetic shield-cum-electrode 36 on the substrate 50 functioning as the slider. A magnetic domain control bias film (a first bias film) 46 is disposed on the both sides of the magnetoresistive layered film 10, and provides the soft magnetic free layer 13 with a single magnetic domain effect. Although other constructional examples will be described later, if other structures than described in the present drawings and so on are used for realizing the single magnetic domain effect, the main purport of embodiments of the present invention is not substantially spoiled. In FIG. 13, the magnetic domain control bias film 46 does not have a direct magnetic domain control effect on the differential magnetic free layer 16, the magnetic domain control effect is applied to the differential free layer 16 via the magnetic domain control of the soft magnetic free layer 13 and the long distance antiparallel coupling layered film 17. Therefore, the magnetic domain control bias film 46 is preferably configured so that the center positions of each of the end sections in the vertical direction of the sheet of FIG. 13 is roughly identical (A and B in the drawing match) to the soft magnetic free layer 13. Further, it is preferable that the end section of the magnetic domain control bias film 46 does not come closer to the differential soft magnetic free layer 16 in the vertical direction of the sheet of FIG. 13 (C and D does not match, in particular, are shifted from each other at least a half of the film thickness of the differential soft magnetic free layer). The antiferromagnetic film 11, the ferromagnetic pinned layer 15, and the intermediate layer 12 are the constituents of the magnetoresistive layered film 10, and is formed by patterning to have appropriate sizes. The insulating layers 731, 732 are disposed so as to appropriately insulate the magnetoresistive layered film 10, and so that an electric current flows normally in the film thickness direction of the magnetoresistive layered film 10.

Figure 14:
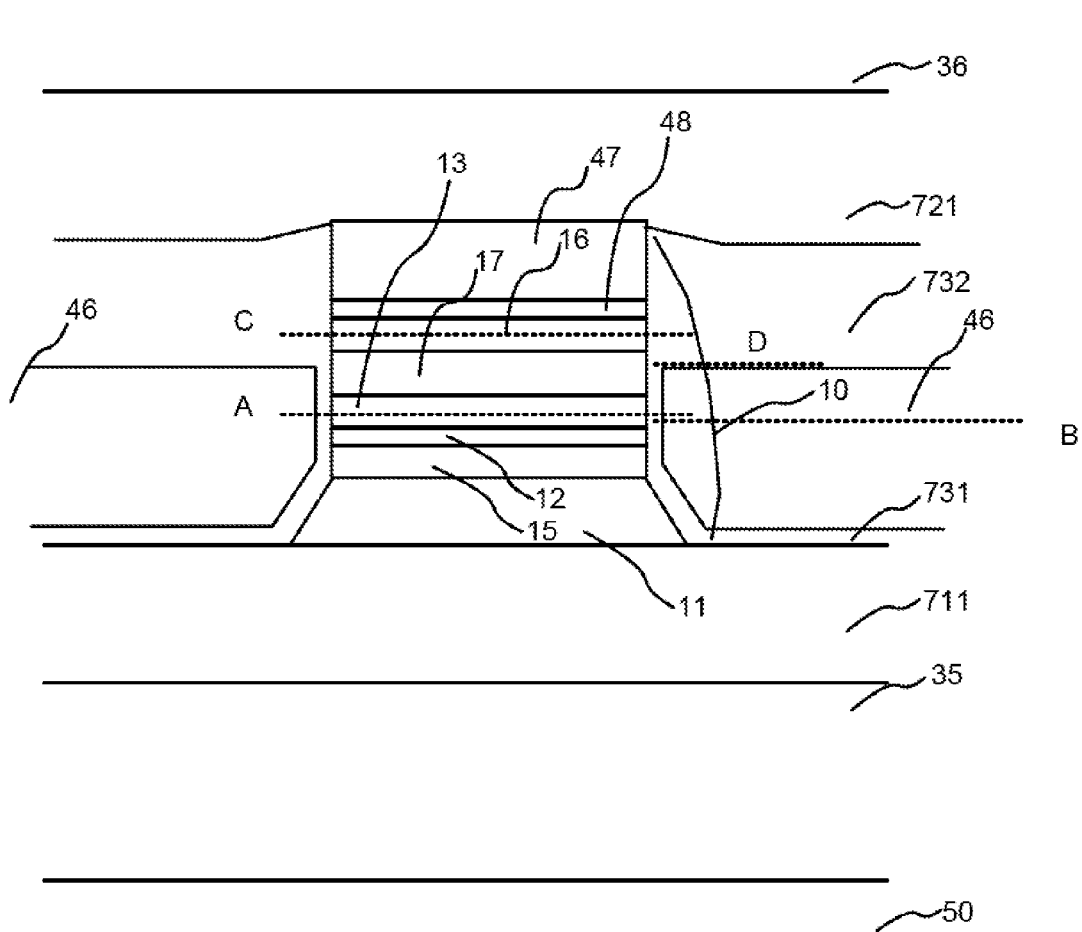
FIG. 14 is a diagram showing another constructional example of the differential magnetic head of an embodiment of the present invention.

FIG. 14 is another constructional example of the differential magnetoresistive magnetic head. It is a drawing viewed from the surface facing the magnetic recording medium. It is configured by forming a lower magnetic shield-cum-electrode 35, a lower electrically conductive gap 711, the magnetoresistive layered film 10, an upper electrically conductive gap 721, and an upper magnetic shield-cum-electrode 36 on the substrate 50 functioning as the slider. A magnetic domain control bias film (a first bias film) 46 is disposed on the both sides of the magnetoresistive layered film 10, and provides the soft magnetic free layer 13 with a single magnetic domain effect. Further, a layered bias film (a second bias film) 47 is stacked on the differential soft magnetic free layer 16 via a magnetic separation layer 48, and is formed to have roughly the same width. The layered bias film 47 has a function of executing the magnetic domain control on the differential soft magnetic free layer 16 with the static magnetic field leaking from the end section thereof. Therefore, the magnetic domain control bias film 46 is preferably configured so that the center positions of each of the end sections in the vertical direction of the sheet of FIG. 14 is roughly identical (A and B in the drawing match) to the soft magnetic free layer 13. Further, it is preferable that the end section of the magnetic domain control bias film 46 does not come closer to the differential soft magnetic free layer 16 in the vertical direction of the sheet of FIG. 14 (C and D does not match, in particular, are shifted from each other at least a half of the film thickness of the differential soft magnetic free layer). The magnetic domain control bias film 46 and the layered bias film 47 are magnetized so as to have the residual magnetization in the same directions, for example, in the right direction of the sheet of FIG. 14, and the magnetic domain control bias film 46 exerts the effect of making the soft magnetic free layer 13 have the single magnetic domain in the right direction while the layered bias film 47 exerts the effect of making the differential soft magnetic free layer 16 have the single magnetic domain in the left direction. Although in the present drawing, the configuration of the magnetoresistive layered film 10 including the layered bias film 47 and the magnetic separation film 48 is shown, if it is defined without including the layered bias film 47 and the magnetic separation film 48 in the configuration of the magnetoresistive layered film 10, the main purport of embodiments of the present invention is not substantially spoiled. The antiferromagnetic film 11, the ferromagnetic pinned layer 15, and the intermediate layer 12 are the constituents of the magnetoresistive layered film 10, and is formed by patterning to have appropriate sizes. The insulating layers 731, 732 are disposed so as to appropriately insulate the magnetoresistive layered film 10, and so that an electric current flows normally in the film thickness direction of the magnetoresistive layered film 10.

Figure 15:
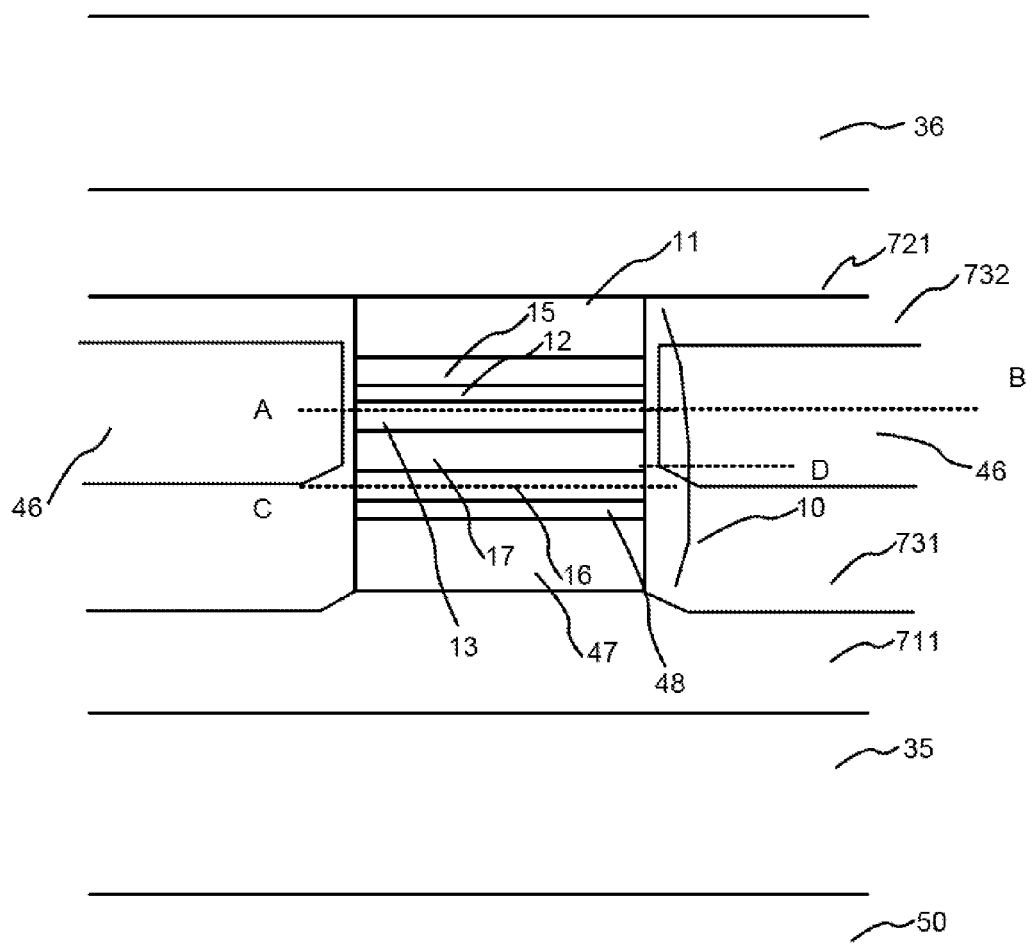
FIG. 15 is a diagram showing still another constructional example of the differential magnetic head of an embodiment of the present invention.

FIG. 15 is still another constructional example of the differential magnetoresistive magnetic head. It is a drawing viewed from the surface facing the magnetic recording medium. It is configured by forming a lower magnetic shield-cum-electrode 35, a lower electrically conductive gap 711, the magnetoresistive layered film 10, an upper electrically conductive gap 721, and an upper magnetic shield-cum-electrode 36 on the substrate 50 functioning as the slider. The magnetoresistive layered film 10 has a configuration with a reversed layered configuration to the substrate 50 with respect to the example shown in FIG. 14. A magnetic domain control bias film (a first bias film) 46 is disposed on the both sides of the magnetoresistive layered film 10, and provides the soft magnetic free layer 13 with a single magnetic domain effect. Further, a layered bias film (a second bias film) 47 is stacked on the differential soft magnetic free layer 16 via a magnetic separation layer 48, and is formed to have roughly the same width. The layered bias film 47 has a function of executing the magnetic domain control on the differential soft magnetic free layer 16 with the static magnetic field leaking from the end section thereof. Therefore, the magnetic domain control bias film 46 is preferably configured so that the center positions of each of the end sections in the vertical direction of the sheet of FIG. 15 is roughly identical (A and B in the drawing match) to the soft magnetic free layer 13. Further, it is preferable that the end section of the magnetic domain control bias film 46 does not come closer to the differential soft magnetic free layer 16 in the vertical direction of the sheet of FIG. 15 (C and D does not match, in particular, are shifted from each other at least a half of the film thickness of the differential soft magnetic free layer). The magnetic domain control bias film 46 and the layered bias film 47 are magnetized so as to have the residual magnetization in the same directions, for example, in the right direction of the sheet of FIG. 15, and the magnetic domain control bias film 46 exerts the effect of making the soft magnetic free layer 13 have the single magnetic domain in the right direction while the layered bias film 47 exerts the effect of making the differential soft magnetic free layer 16 have the single magnetic domain in the left direction. Although in the present drawing, the configuration of the magnetoresistive layered film 10 including the layered bias film 47 and the magnetic separation film 48 is shown, if it is defined without including the layered bias film 47 and the magnetic separation film 48 in the configuration of the magnetoresistive layered film 10, the main purport of embodiments of the present invention is not substantially spoiled. The antiferromagnetic film 11, the ferromagnetic pinned layer 15, and the intermediate layer 12 are the constituents of the magnetoresistive layered film 10, and is formed by patterning to have appropriate sizes. The insulating layers 731, 732 are disposed so as to appropriately insulate the magnetoresistive layered film 10, and so that an electric current flows normally in the film thickness direction of the magnetoresistive layered film 10. The configuration of FIG. 15 has the position of the magnetic domain control bias film 46 in an upper part of the sheet compared to the configuration of FIG. 14, thus the manufacturing process becomes relatively easy.

Figure 16:
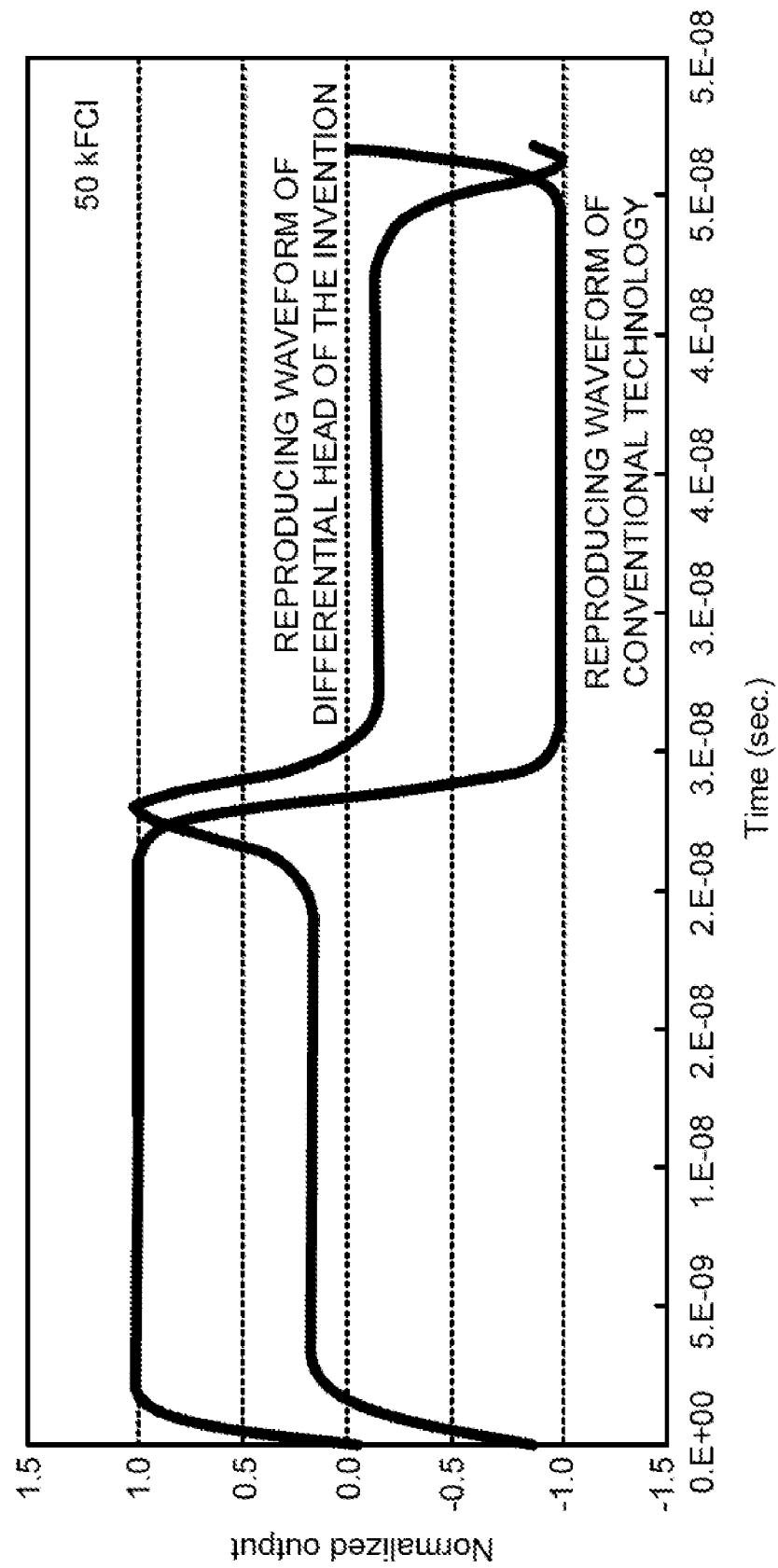
FIG. 16 is a diagram showing a comparison between the reproducing waveform of the differential magnetic head of the present invention and the reproducing waveform of the conventional head, the reproducing waveforms being obtained by calculations.

FIG. 16 shows a comparison between the reproducing waveform of the differential head of the present invention represented by the embodiments described above and the reproducing waveform of the conventional head, the reproducing wave forms being obtained by calculations. In the case with the perpendicular magnetic recording, as shown in the drawing, the reproducing waveform having a rectangular-wave shape is obtained by the conventional magnetic head the resolution of which is determined by the magnetic shields. On the other hand, in the differential head of an embodiment of the present invention, as shown in the drawing, the peak is reproduced at the position where the transition section is formed in the conventional reproducing waveform. Seemingly, it is similar to the reproducing waveform of the conventional in-plane recording. This is because in the differential head of one embodiment of the present invention, the differential output by the two magnetic layers with an appropriate distance is formed, and thus the differentiated waveform is obtained. Further, in the part except the peak sections, relatively faint signal output with positive or negative polarity such as a so-called base-line shift is observed. This is because the output corresponding to the in-phase magnetic field is smaller than that corresponding to the differential magnetic field, but not equal to zero, and the relatively faint signal output can be reduced by making the antiferromagnetic coupling magnetic field between the soft magnetic free layer and the differential soft magnetic free layer sufficiently strong.

Figure 17:
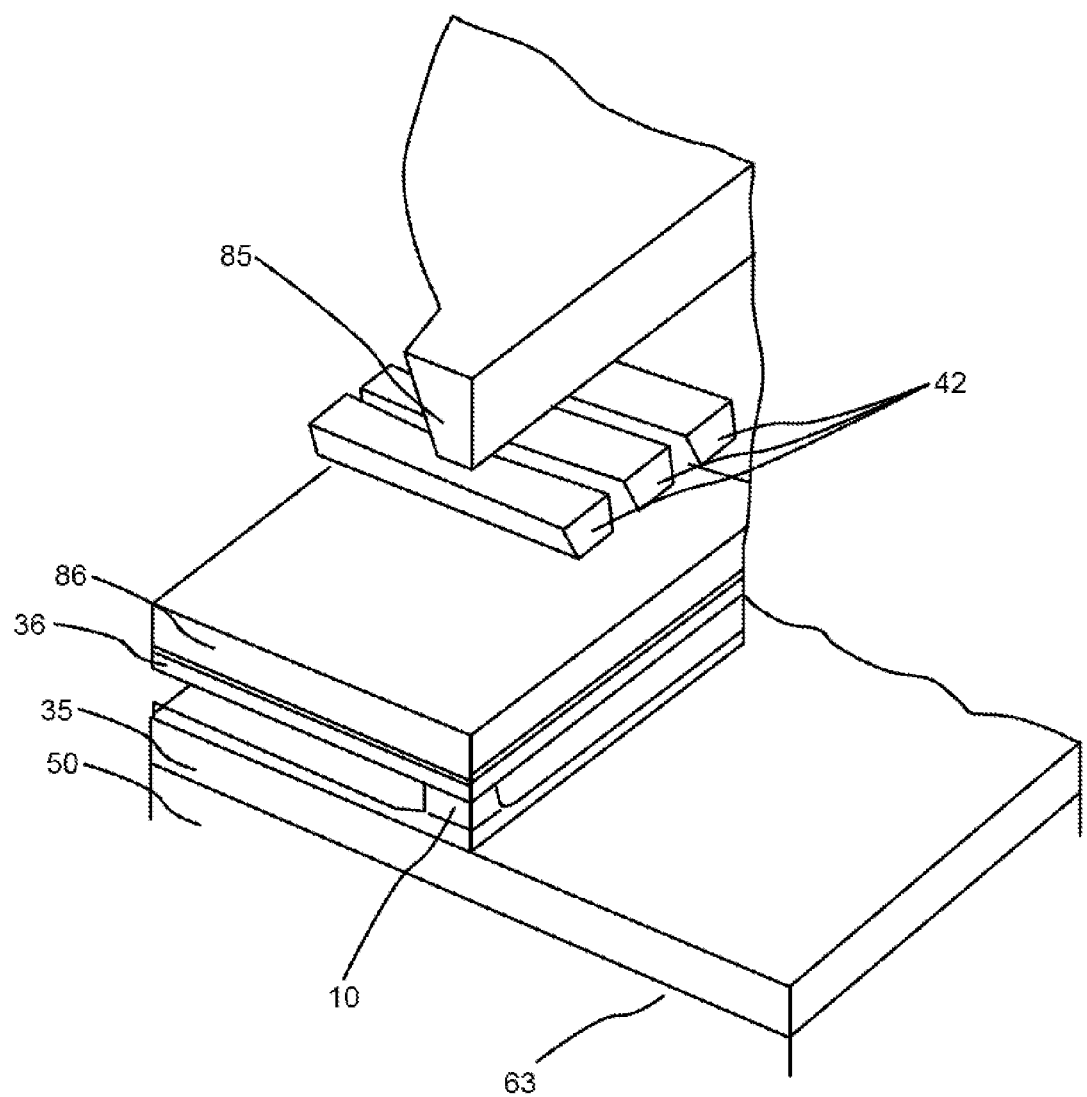
FIG. 17 is a conceptual diagram of the recording/reproducing separation type magnetic head for perpendicular magnetic recording having the magnetoresistive layered film of an embodiment of the present invention.

FIG. 17 is a conceptual diagram of a recording/reproducing separation type magnetic head for the perpendicular magnetic recording having the differential magnetoresistive magnetic head according to embodiments of the invention mounted thereon. It is configured by forming the magnetoresistive layered film 10, the lower magnetic shield-cum-electrode 35, the upper magnetic shield-cum-electrode 36, a sub-magnetic pole 86, a coil 42, and a main magnetic pole 85 on the substrate 50 functioning as a slider, and an opposed surface 63 opposed to the recording medium is provided. The single magnetic domain structure corresponding to the magnetic domain control bias film 46 shown in FIGS. 13 through 15 is omitted from the description in the present drawing. The differential magnetoresistive magnetic bead of embodiments of the present invention is for improving the performance of the reproducing section, and therefore, is a technology capable of corresponding to both of the perpendicular magnetic recording and the conventional in-plane recording, and in particular by combining it with the perpendicular magnetic recording head, a higher recording density can be achieved.

Figure 18:
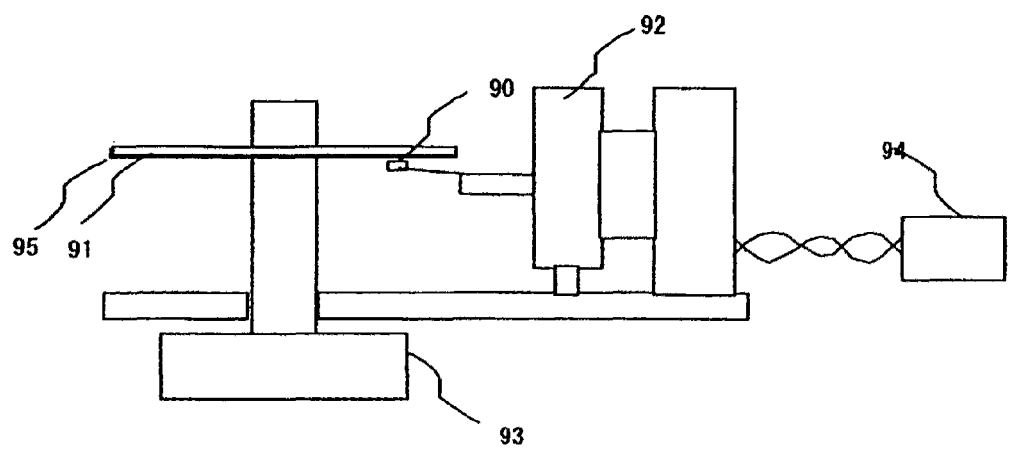
FIG. 18 is a diagram showing the configuration example of the magnetic disk drive using the differential magnetoresistive magnetic head of an embodiment of the present invention.

FIG. 18 is a configuration example of a magnetic recording and reproducing device having the differential magnetoresistive magnetic head described above or the recording/reproducing separation type magnetic head for the perpendicular magnetic recording mounted thereon. A magnetic disk 95 holding a recording medium 91 on which information is magnetically recorded is rotated by a spindle motor 93, and the head slider 90 is guided on a track of the magnetic disk 95 by an actuator 92. In other words, in the magnetic disk drive, the read head or the recording-and-read head formed on the head slider 90 is relatively moved by the head actuator 92 while coming close to a predetermined recording position on the magnetic disk 95, sequentially writes and reads signals. The actuator 92 is preferably a rotary actuator. The recording signal is recorded on the medium by the recording head via the signal processing system 94, and the output of the read head is obtained as a signal via the signal processing system 94. Further, when moving the read head onto the desired recording track, the position on the track is detected using the highly-sensitive output from the present read head, and the positioning of the head slider 90 can be performed by controlling the actuator 92. Although one head slider 90 and one magnetic disk 95 are shown in the present drawing, a plurality of head sliders and a plurality of magnetic disks can also be included. Further, the magnetic disk 95 can be provided with the recording medium 91 on the both sides for recording information. In the case in which information is recorded on the both sides of the disk, the head slider 90 is provided on each of the both sides of the disk.

As a result of the examination of the magnetic characteristic of the magnetic disk drive having the differential magnetoresistive magnetic head of embodiments of the present invention described above mounted thereon, in the magnetic recording with a short recording wavelength and a narrow recording track width, a sufficient output and high resolution were presented, and further, the yield in the manufacturing process was also preferable.

What is claimed is:

1. A differential magnetoresistive magnetic head comprising:
    a magnetoresistive layered film formed by stacking a ferromagnetic pinned layer having magnetization substantially pinned with respect to an external magnetic field to be detected, a non-magnetic intermediate layer, a soft magnetic free layer having a magnetization direction varied in accordance with the external magnetic field, an antiparallel coupling layered film, and a differential soft magnetic free layer,
    wherein the antiparallel coupling layered film exerts antiferromagnetic coupling force for coupling mutual magnetizations in an antiparallel manner between the soft magnetic free layer and the differential soft magnetic free layer, and
    a magnetization direction of the soft magnetic free layer and a magnetization direction of the differential soft magnetic free layer rotate either in a same direction or opposite directions depending on the external magnetic field to perform a differential operation.

2. The differential magnetoresistive magnetic head according to claim 1,
    wherein when the external magnetic fields with the same directions are applied to the soft magnetic free layer and the differential soft magnetic free layer, magnetization rotations of the soft magnetic free layer and the differential soft magnetic free layer are canceled with each other, and when the external magnetic fields with directions opposite to each other are applied to the soft magnetic free layer and the differential soft magnetic free layer, magnetizations of the soft magnetic free layer and the differential soft magnetic free layer vary in the same rotational directions.

3. The differential magnetoresistive magnetic head according to claim 1,
    wherein the antiparallel coupling layered film disposed between the soft magnetic free layer and the differential soft magnetic free layer comprises alternately stacked n, an even number, total magnetic layers and n+1 total antiparallel coupling layers, first and second magnetic layers adjacent to each other via one of the antiparallel coupling layers being antiferromagnetically coupled with each other.

4. The differential magnetoresistive magnetic head according to claim 3,
    wherein each antiparallel coupling layer is made of one specie selected from the group consisting of Ru, Ir, Os, Re, and Rh, or an alloy being primarily of these materials, and has a thickness of 0.3 through 0.5 nanometer.

5. The differential magnetoresistive magnetic head according to claim 3,
    wherein each antiparallel coupling layer is made of one specie selected from the group consisting of Ru, Ir, Os, Re, and Rh, or an alloy being primarily of these materials, and has a thickness of 0.7 through 1 nanometer.

6. The differential magnetoresistive magnetic head according to claim 3,
    wherein the magnetic layers are made of magnetic metal being primarily of one of CoFe and NiFe, have amount of magnetization equivalent to or smaller than that of each of the soft magnetic free layer and the differential soft magnetic free layer, and a thickness no smaller than 0.5 nanometer and smaller than 4 nanometers.

7. The differential magnetoresistive magnetic head according to claim 3,
    wherein n is an even number in a range of 2 through 8.

8. The differential magnetoresistive magnetic head according to claim 3,
    wherein the magnetizations of the soft magnetic free layer, the differential soft magnetic free layer and the magnetic layers are coupled in an antiparallel manner, and the total amount of magnetizations is about zero.

9. The differential magnetoresistive magnetic head according to claim 1,
    wherein a distance between the soft magnetic free layer and the differential soft magnetic free layer defined by a thickness of the antiparallel coupling layered film is no smaller than 3 nanometers and no greater than 20 nanometers.

10. The differential magnetoresistive magnetic head according to claim 9,
    wherein the antiparallel coupling layered film comprises antiparallel coupling layers laminated with magnetic layers, the antiparallel coupling layers being formed of one specie selected from the group consisting of Ru, Ir, Os, Re, and RH, or an alloy being primarily of these materials, and wherein each of the antiparallel coupling layers has a thickness of 0.3 through 0.5 nanometer.

11. The differential magnetoresistive magnetic head according to claim 9,
    wherein the antiparallel coupling layered film of comprises antiparallel coupling layers laminated with magnetic layers, the antiparallel coupling layers being formed of one specie selected from the group consisting of Ru, Ir, Os, Re, and Rh, or an alloy being primarily of these materials, and wherein each of the antiparallel coupling layers has a thickness of 0.7 through 1 nanometer.

12. The differential magnetoresistive magnetic head according to claim 9,
    wherein the antiparallel coupling layered film comprises antiparallel coupling layers laminated with magnetic layers,
    wherein each of the magnetic layers are made of magnetic metal being primarily of one of CoFe and NiFe, have amount of magnetization equivalent to or smaller than that of each of the soft magnetic free layer and the differential soft magnetic free layer, and a thickness no smaller than 0.5 nanometer and smaller than 4 nanometers.

13. The differential magnetoresistive magnetic head according to claim 1,
    wherein a pair of first bias films for making the soft magnetic free layer have single magnetic domain are disposed on a side section of the end section in a track width direction of the soft magnetic free layer, and a center position of the first bias films in the thickness direction is made closer to the soft magnetic free layer than the differential soft magnetic free layer in the periphery of the side section of the end section so that the magnetic field applied from the first bias film is dominantly applied to the soft magnetic free layer rather than the differential soft magnetic free layer.

14. The differential magnetoresistive magnetic head according to claim 1,
    wherein a second bias film for making the differential soft magnetic free layer have a single magnetic domain via a non-magnetic film is stacked on the differential soft magnetic free layer, and the second bias film has a width in the track direction substantially the same as that of the differential soft magnetic free layer.

15. The differential magnetoresistive magnetic head according to claim 1,
wherein the magnetoresistive layered film is one of current-perpendicular-to-the-plane type giant magnetoresistive layered film, or tunneling magnetoresistive layered film.

16. A differential magnetoresistive magnetic head comprising:
a magnetoresistive layered film comprising a differential soft magnetic free layer, an antiparallel coupling layered film comprising a stack of antiparallel coupling layers separated by magnetic layers, a soft magnetic free layer having a magnetization direction varied in accordance with an external magnetic field to be detected, a nonmagnetic intermediate layer, and a ferromagnetic pinned layer having a magnetization substantially pinned with respect to the external magnetic field,
wherein the antiparallel coupling layered film exerts antiferromagnetic coupling force for coupling mutual magnetizations in an antiparallel manner between the soft magnetic free layer and the differential soft magnetic free layer, and
a magnetization direction of the soft magnetic free layer and a magnetization direction of the differential soft magnetic free layer rotate either in a same direction or opposite directions depending on the external magnetic field to perform a differential operation,
wherein the differential soft magnetic layer is directly adjacent one of the antiparallel coupling layers, wherein the soft magnetic free layer is directly adjacent another of the antiparallel coupling layers.

17. The differential magnetoresistive magnetic head according to claim 16,
wherein when the external magnetic fields with the same directions are applied to the soft magnetic free layer and the differential soft magnetic free layer, magnetization rotations of the soft magnetic free layer and the differential soft magnetic free layer are canceled with each other, and when the external magnetic fields with directions opposite to each other are applied to the soft magnetic free layer and the differential soft magnetic free layer, magnetizations of the soft magnetic free layer and the differential soft magnetic free layer vary in the same rotational directions.

18. The differential magnetoresistive magnetic head according to claim 16,
wherein the antiparallel coupling layered film has n, an even number, total magnetic layers and n+1 total antiparallel coupling layers, first and second magnetic layers adjacent to each other via one of the antiparallel coupling layers being antiferromagnetically coupled with each other.

19. The differential magnetoresistive magnetic head according to claim 16,
wherein a distance between the soft magnetic free layer and the differential soft magnetic free layer defined by a thickness of the antiparallel coupling layered film is no smaller than 3 nanometers and no greater than 20 nanometers.

\* \* \* \* \*

UNITED STATES PATENT AND TRADEMARK OFFICE
CERTIFICATE OF CORRECTION

PATENT NO.       : 8,174,799 B2
APPLICATION NO.  : 12/218860
DATED            : May 8, 2012
INVENTOR(S)      : Hoshiya et al.

Page 1 of 1

It is certified that error appears in the above-identified patent and that said Letters Patent is hereby corrected as shown below:

On the title page item (75), line 3, replace inventor "You Sato" with --Yo Sato--.

col. 3, line 11, replace "beads" with --heads--;
col. 18, line 24, replace "bead" with --head--.

Signed and Sealed this
Twenty-first Day of August, 2012

David J. Kappos
*Director of the United States Patent and Trademark Office*